(12) United States Patent
Yamauchi et al.

(10) Patent No.: US 9,274,827 B2
(45) Date of Patent: Mar. 1, 2016

(54) DATA PROCESSING APPARATUS, TRANSMITTING APPARATUS, TRANSMISSION CONTROL METHOD, SCHEDULING METHOD, AND COMPUTER PRODUCT

(71) Applicant: FUJITSU LIMITED, Kawasaki-shi, Kanagawa (JP)

(72) Inventors: Hiromasa Yamauchi, Usakos (NA); Koichiro Yamashita, Hachioji (JP); Takahisa Suzuki, Yokohama (JP); Koji Kurihara, Kawasaki (JP); Toshiya Otomo, Kawasaki (JP); Yuta Teranishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 14/316,285

(22) Filed: Jun. 26, 2014

(65) Prior Publication Data

US 2014/0310723 A1 Oct. 16, 2014

Related U.S. Application Data

(63) Continuation of application No. PCT/JP2011/080510, filed on Dec. 28, 2011.

(51) Int. Cl.
| | |
|---|---|
| *G06F 3/00* | (2006.01) |
| *G06F 9/44* | (2006.01) |
| *G06F 9/46* | (2006.01) |
| *G06F 9/48* | (2006.01) |

(52) U.S. Cl.
CPC ................ *G06F 9/46* (2013.01); *G06F 9/4812* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 4,532,586 A | | 7/1985 | Bratt et al. | |
| 5,481,726 A | * | 1/1996 | Kumaki | G06F 13/24 709/226 |
| 5,678,521 A | * | 10/1997 | Thompson | F02M 63/00 123/446 |

FOREIGN PATENT DOCUMENTS

| | | |
|---|---|---|
| JP | 62-279430 | 12/1987 |
| JP | 6-83754 | 3/1994 |

(Continued)

OTHER PUBLICATIONS

PCT International Preliminary Report on Patentability mailed Jul. 10, 2014 in corresponding International Patent Application No. PCT/JP2011/080510.

(Continued)

*Primary Examiner* — Craig Dorais
(74) *Attorney, Agent, or Firm* — Staas & Halsey LLP

(57) ABSTRACT

A data processing apparatus includes a processor configured to receive an interrupt request that is a trigger for execution of an interrupt process executed by the processor; store the received interrupt request to a recording area; calculate based on a time when the interrupt request is received and particular time information read from the recording area, a predicted time when a subsequent interrupt request is to be received; detect a thread to be executed by the processor, among executable threads of the processor; judge based on the calculated predicted time and a current time, whether there is a possibility of the interrupt process being executed while the detected thread is under execution; decide based on a judgment result, whether to execute the detected thread on the processor; and execute the detected thread on the processor, based on a decision result.

13 Claims, 18 Drawing Sheets

(56) References Cited

FOREIGN PATENT DOCUMENTS

| | | |
|---|---|---|
| JP | 8-263305 | 10/1996 |
| JP | 2006-72991 | 3/2006 |

OTHER PUBLICATIONS

International Search Report mailed Feb. 21, 2012 in corresponding International Patent Application No. PCT/JP2011/080510.

* cited by examiner

| BUS ACCESS COUNT THRESHOLD | INTERRUPT-PROHIBIT-INSTRUCTION EXECUTION COUNT THRESHOLD | MAXIMUM DIVISOR | SPECIFIED-PROCESS NON-EXECUTION INTERVAL |
|---|---|---|---|
| aa [TIMES] | bb [TIMES] | 4 | 500 [mSEC] |

| INTERRUPT ID | THREAD ID | OPERATION CONTENTS | INTERRUPT INTERVAL | PREVIOUS INTERRUPT TIME | PREDICTED TIME OF NEXT INTERRUPT | INTERRUPT COUNT WITHIN CONSTANT PERIOD |
|---|---|---|---|---|---|---|
| int#0 | THREAD 2 | SKIP TRACK OF MUSIC BEING PLAYED | 10 [SEC] | 12:00:10 | 12:00:20 | 2 [TIMES] |
| int#1 | THREAD 3 | JUMP TO DESTINATION OF BROWSER LINK | 20 [SEC] | 12:03:00 | 12:03:20 | 3 [TIMES] |
| ... | ... | ... | ... | ... | ... | ... |

FIG.8

| CPU INTERRUPT INSTRUCTION STATE TABLE | | ~314 |
|---|---|---|

| CPU_ID | STATE TYPE | |
|---|---|---|
| CPU#0 | 0 | ~314-0 |
| CPU#1 | 1 | ~314-1 |
| ... | ... | |
| CPU#n | 0 | ~314-n |

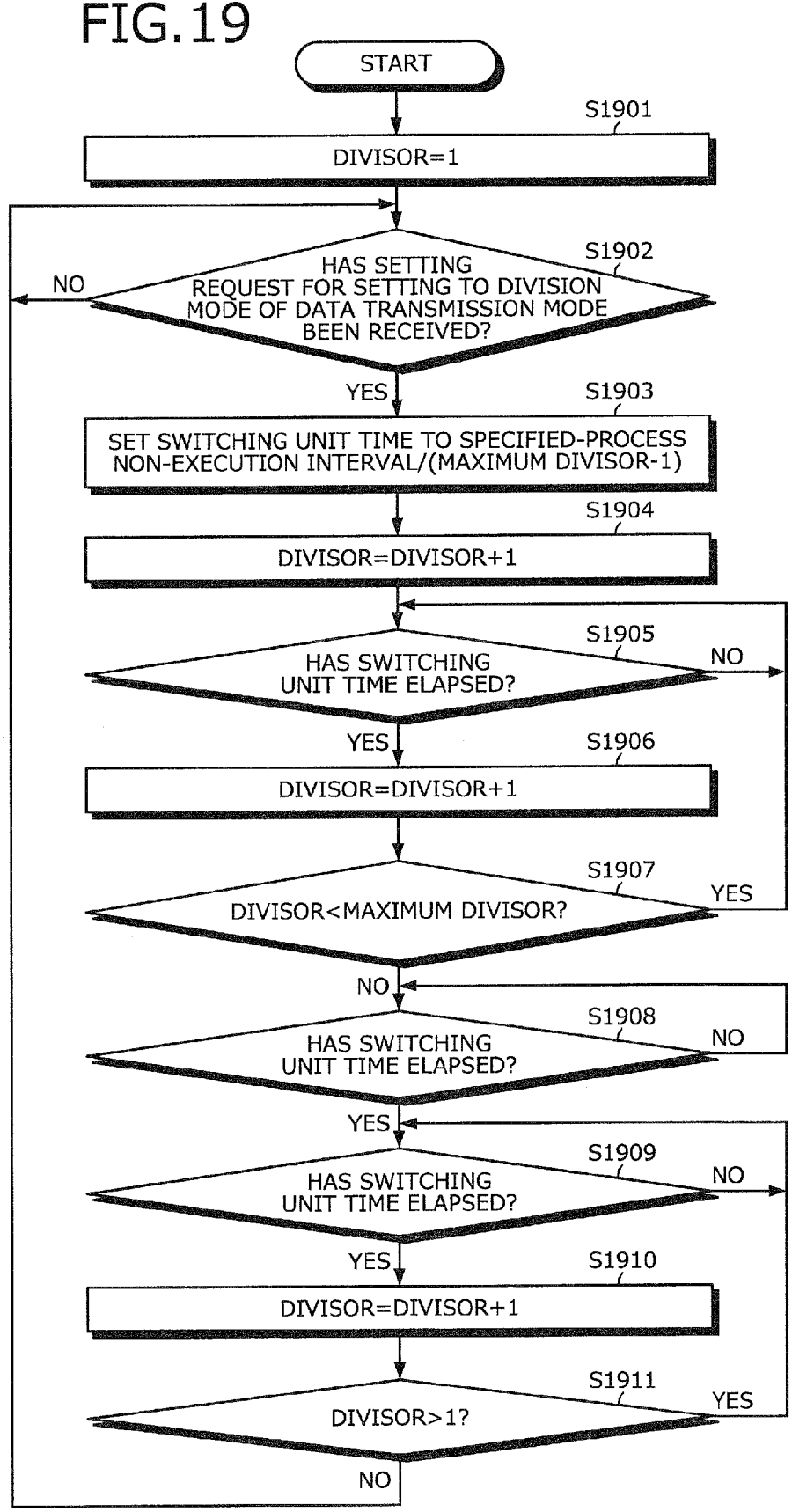

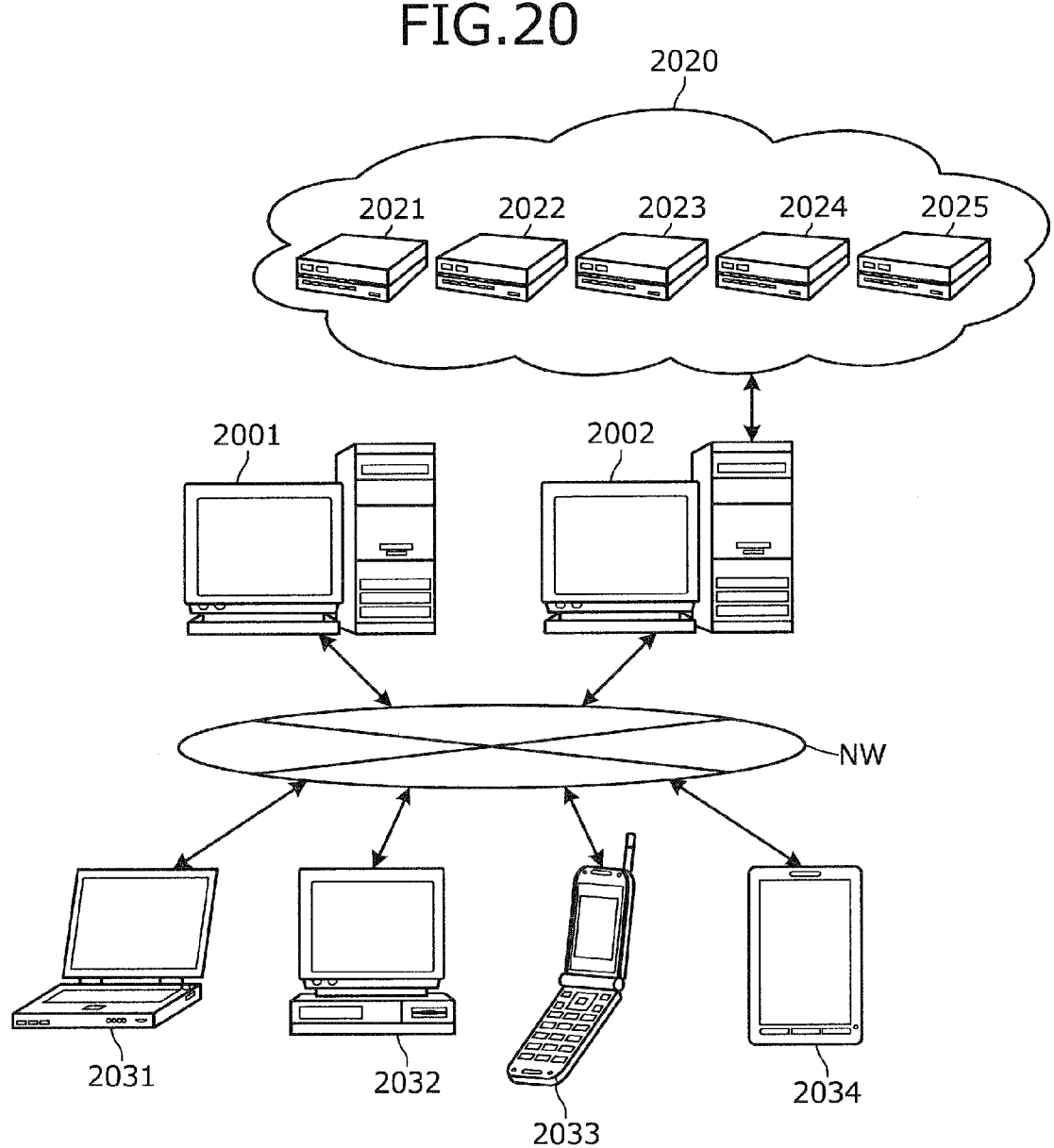

US 9,274,827 B2

DATA PROCESSING APPARATUS, TRANSMITTING APPARATUS, TRANSMISSION CONTROL METHOD, SCHEDULING METHOD, AND COMPUTER PRODUCT

CROSS REFERENCE TO RELATED APPLICATIONS

This application is a continuation application of International Application PCT/JP2011/080510, filed on Dec. 28, 2011 and designating the U.S., the entire contents of which are incorporated herein by reference.

FIELD

The embodiments discussed herein are related to a data processing apparatus, a transmitting apparatus, a transmission control method, a scheduling method, and a computer product.

BACKGROUND

Recently, multi-programming technologies are present that cause multiple programs to run on a single central processing unit (CPU). Specifically, an operating system (OS) has a function of dividing the processing period of the CPU. Threads are assigned to the resulting sub-periods, whereby the CPU runs the multiple threads. A program is executed in units of threads.

For example, according to a related technology, an electronic device has a normal mode and an energy-saving mode as operation modes, and switches the operation modes with consideration of the power consumed for a transition process and a recovery process to switch the operation mode (for example, refer to Japanese Laid-Open Patent Publication No. 2006-72991).

Nonetheless with the conventional technologies above, the bus becomes occupied when a thread that frequently performs data transmission to memory is executed. Here, even if a CPU receives an interrupt request and attempts to cause another CPU to execute an interrupt process, the CPU cannot cause the other CPU to execute the interrupt process until the bus is released, causing response performance to drop. Further, when a thread that frequently issues an interrupt prohibit instruction is executed, the interrupt process cannot be executed, causing the response performance to drop.

SUMMARY

According to an aspect of an embodiment, a data processing apparatus includes a processor configured to receive an interrupt request that is a trigger for execution of an interrupt process executed by the processor; store the received interrupt request to a recording area; calculate based on a time when the interrupt request is received and particular time information read from the recording area, a predicted time when a subsequent interrupt request is to be received; detect a thread to be executed by the processor, among executable threads of the processor; judge based on the calculated predicted time and a current time, whether there is a possibility of the interrupt process being executed while the detected thread is under execution; decide based on a judgment result, whether to execute the detected thread on the processor; and execute the detected thread on the processor, based on a decision result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram depicting an example of a CPU interrupt instruction state table;

FIG. 19 is a flowchart that depicts one example of a procedure of a process of the DMA controller; and FIG. 20 is a diagram depicting an application example of a system employing a computer according to the present embodiment.

DESCRIPTION OF EMBODIMENTS

Embodiments of a data processing apparatus, a transmitting apparatus, a transmission control method, a scheduling method, and a computer product will be described in detail with reference to the accompanying drawings.

Figure 1:
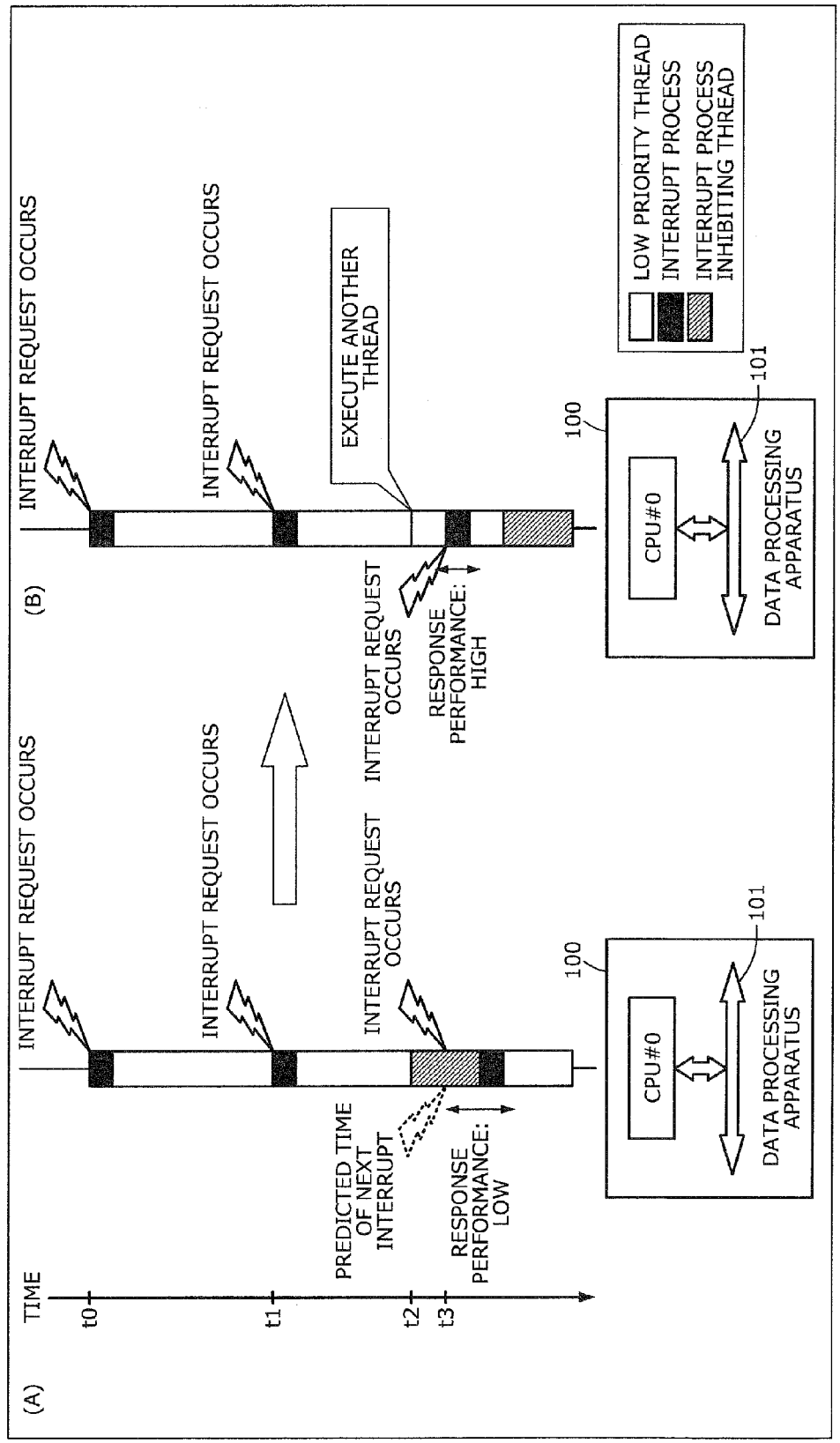
FIG. 1 is a diagram depicting an operation example of a data processing apparatus.

FIG. 1 is a diagram depicting an operation example of a data processing apparatus. A data processing apparatus 100 includes a CPU#0 that controls the data processing apparatus 100 overall and a bus 101 that connects the hardware of the data processing apparatus 100. The CPU#0 executes low-priority threads whose execution priority is low. Upon receiving an interrupt request, the CPU#0 executes an interrupt process for which the execution priority high. The CPU#0 further executes interrupt process inhibiting threads that inhibit execution of the interrupt process. A factor causing the execution of the interrupt process to be inhibited is, for example, when an interrupt process inhibiting thread frequently accesses the bus 101 causing the execution of the interrupt process to be delayed. Another factor is, for example, when an interrupt process inhibiting thread frequently issues an interrupt prohibit instruction, causing the execution of the interrupt process to be delayed.

Hereinafter, a thread that frequently accesses the bus 101 will be called a "bus occupying thread". Similarly, a thread that frequently issues an interrupt prohibit instruction will be called an interrupt prohibiting thread. A method of judging whether bus access/interrupt prohibit instruction issuance is frequent will be described with reference to FIGS. 5 and 6.

Here, improved response performance by prompt execution of the interrupt process by the data processing apparatus 100 according to the present embodiment is assumed as an object. As common settings in (A) and (B) of FIG. 1, an interrupt request is issued at times t0 and t1, respectively; and the CPU#0 executes the interrupt process in response to the interrupt request. When the interrupt request is received at time t1, the CPU#0 calculates time t3 as a predicted time when the next interrupt request will be issued. (A) of FIG. 1 depicts the execution state of a thread in a case where the interrupt inhibiting cause has not been excluded, and (B) depicts the execution state of the thread in a case where the interrupt inhibiting cause has been excluded.

In (A) of FIG. 1, when the timing of thread switching arrives at time t2, the CPU#0 executes an interrupt process inhibiting thread among threads stored to an executable queue. The executable queue is a queue that stores threads that are in an executable state. If an interrupt request is issued at time t3, the execution of the interrupt process is delayed by the interrupt process inhibiting thread, causing the response performance to drop.

In (B) of FIG. 1, when the timing of thread switching arrives at time t2, the CPU#0 judges from time t3 (predicted time) and time t2 (current time), whether there is a possibility of the interrupt process being executed while the interrupt process inhibiting thread, which is scheduled for execution, is under execution. In the example depicted in FIG. 1, the CPU#0 judges that the possibility exists and without executing the interrupt process inhibiting thread, executes another thread. As a result, at time t3, even if an interrupt request is issued, the interrupt process can be executed promptly to improve the response performance.

Thus, the data processing apparatus 100 obtains the predicted time when an interrupt request will next occur, and when executing a thread, if the current time is near the predicted time, the data processing apparatus 100 does not execute the thread. As a result, the data processing apparatus 100 can improve the response performance since the interrupt process for an interrupt request is not inhibited.

Figure 2:
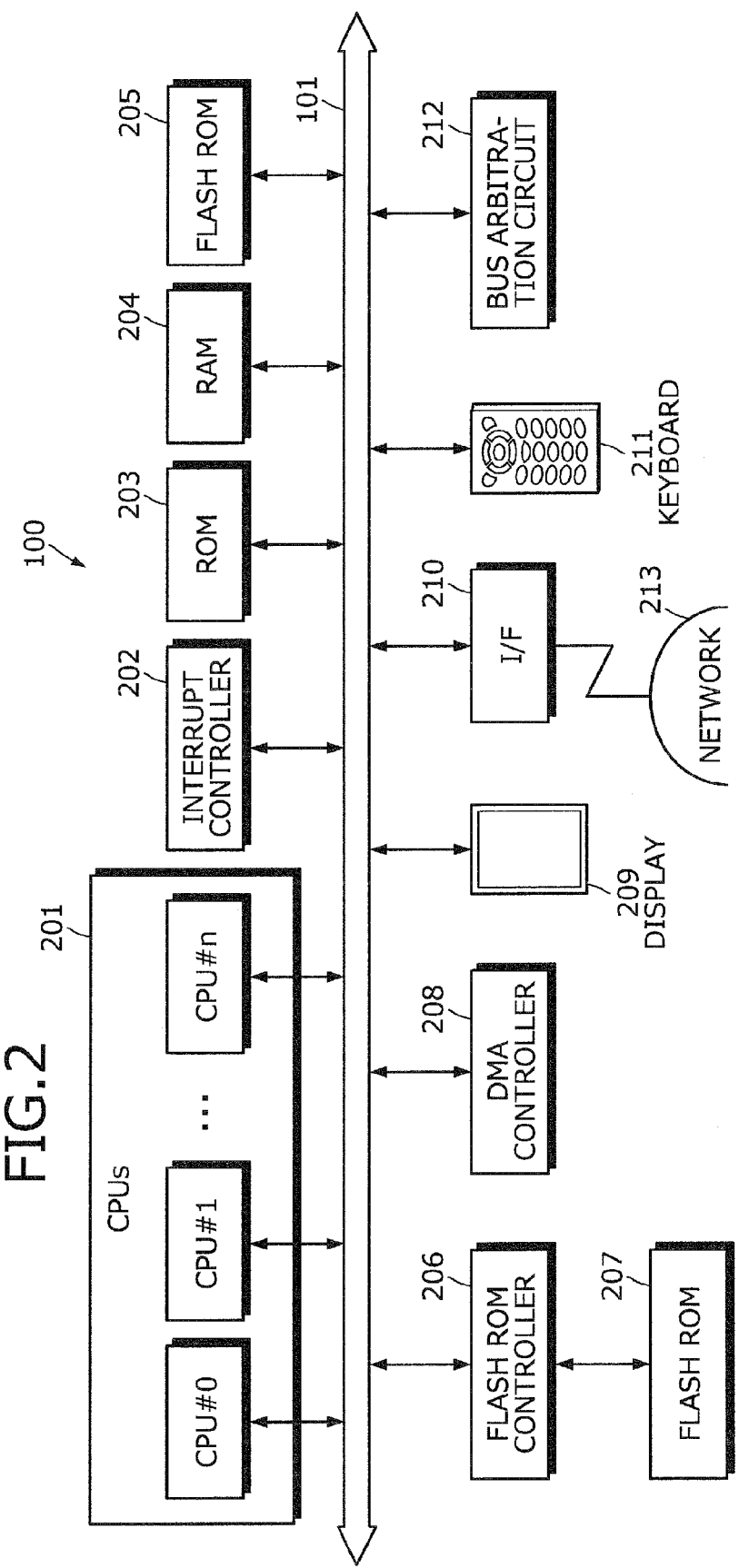
FIG. 2 is a block diagram of an example of hardware of the data processing apparatus.

FIG. 2 is a block diagram of an example of hardware of the data processing apparatus. The data processing apparatus 100 is assumed to be a mobile terminal such as a mobile telephone. In FIG. 2, the data processing apparatus 100 includes CPUs 201, an interrupt controller 202, read-only memory (ROM) 203, random access memory (RAM) 204, flash ROM 205, a flash ROM controller 206, flash ROM 207, a DMA controller 208, a display 209, an interface (I/F) 210, a keyboard 211, and a bus arbitration circuit 212, respectively connected by the bus 101.

The CPUs 201 govern overall control of the data processing apparatus 100. The CPUs 201 include the CPU#0 to CPU#n, where n is an integer of 0 or greater. The CPUs 201 may have dedicated cache memory. The data processing apparatus 100 may be a multi-core processor system having multiple cores. A multi-core processor system is a computer system that includes a processor equipped with cores in plural. Provided that the cores are equipped in plural, the cores may be provided as a single processor equipped with multiple cores, or a group of single-core processors connected in parallel. In the present embodiment, description will be given taking an example where CPUs that are single-core processors are connected in parallel.

The interrupt controller 202 receives an interrupt signal from hardware such as the display 209, the keyboard 211, etc., and gives notification to any one of the CPUs 201. The ROM 203 stores programs such as a boot program. The RAM 204 is used as a work area of the CPUs 201. The flash ROM 205 is flash ROM having a high read out speed and is NOR-type flash memory, for example. The flash ROM 205 stores system software such as the OS and applications. For example, when the OS is updated, the data processing apparatus 100 receives the new OS via the I/F 210 and updates the old OS stored in the flash ROM 205 with the new OS received.

The flash ROM controller 206, under the control of the CPUs 201, controls the reading and writing of data with respect to the flash ROM 207. The flash ROM 207 is flash ROM that stores data, has a primary purpose of portability, and may be, for example, NAND-type flash memory. The flash ROM 207 stores the data written thereto under the control of the flash ROM controller 206. Examples of the data include image data and video data obtained by the user of the data processing apparatus 100 via the I/F 210, as well as a scheduling program and a transmission control program according to the present embodiment. A memory card, SD card and the like may be adopted as the flash ROM 207.

The DMA controller 208 is an apparatus that transmits data without involvement of the CPUs 201. For example, the DMA controller 208 transmits data from the RAM 204 to a buffer of the display 209.

The display 209 displays, for example, data such as text, images, functional information, etc., in addition to a cursor, icons, and/or tool boxes. A thin-film-transistor (TFT) liquid crystal display and the like may be employed as the display 209.

The I/F 210 is connected to a network 213 such as a local area network (LAN), a wide area network (WAN), and the Internet through a communication line and is connected to other apparatuses through the network 213. The I/F 210 administers an internal interface with the network 213 and controls the input and output of data with respect to external apparatuses. For example, a modem or a LAN adaptor may be employed as the I/F 210.

The keyboard 211 includes, for example, keys for inputting letters, numerals, and various instructions and performs the input of data. Alternatively, a touch-panel-type input pad or numeric keypad, etc. may be adopted. The bus arbitration circuit 212 arbitrates access of the bus 101.

Figure 3:
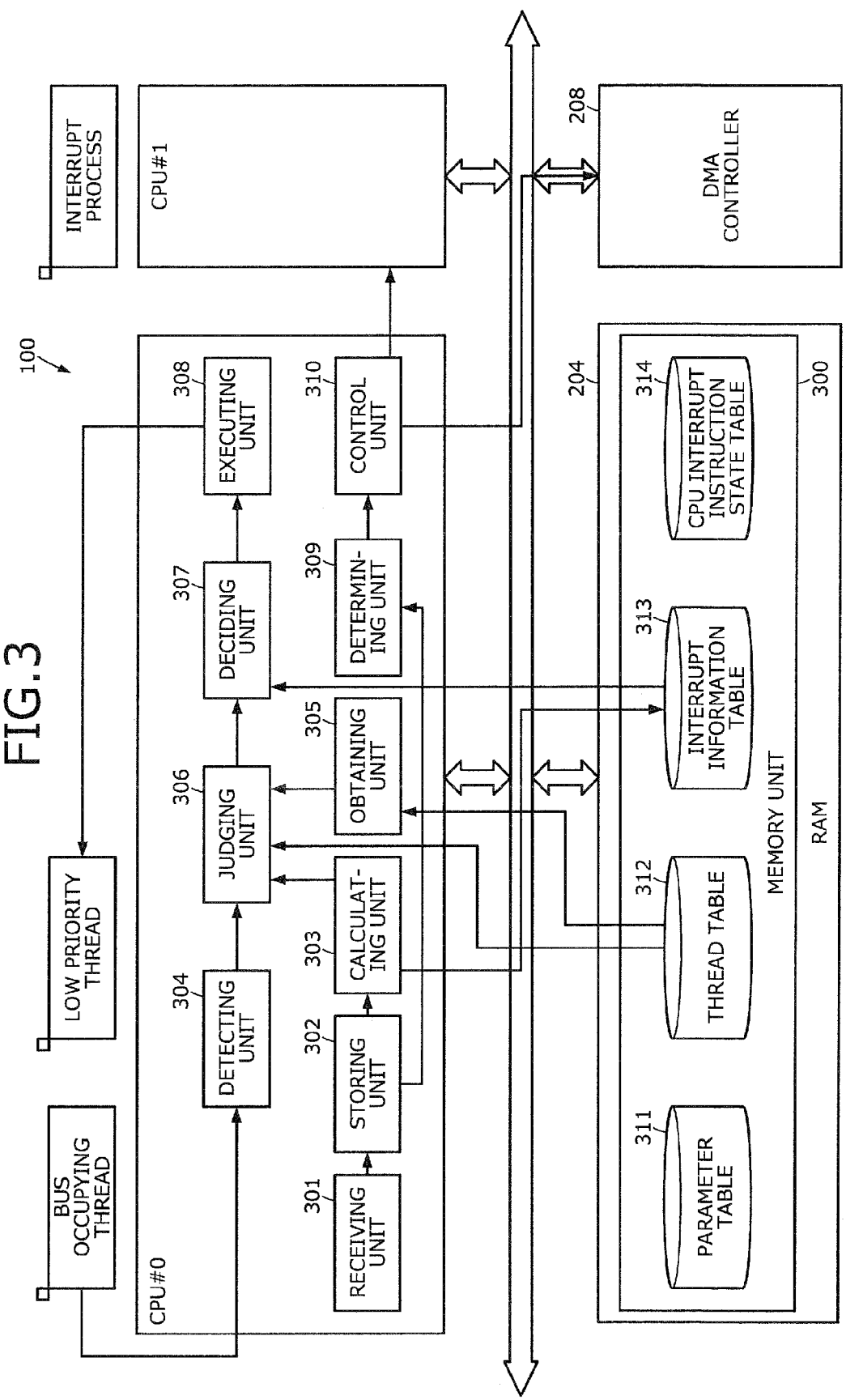
FIG. 3 is a block diagram of a functional configuration of the data processing apparatus.

Functions of the data processing apparatus 100 will be described. FIG. 3 is a block diagram of a functional configuration of the data processing apparatus. The data processing apparatus 100 includes a memory unit 300, a receiving unit 301, a storing unit 302, a calculating unit 303, a detecting unit 304, an obtaining unit 305, a judging unit 306, a deciding unit 307, an executing unit 308, a determining unit 309, and a control unit 310. Functions of the receiving unit 301 to the control unit 310 are implemented by executing on the CPU#0, a program recorded in a memory apparatus. The memory apparatus, for example, is the ROM 203, the RAM 204, the flash ROM 205, and the flash ROM 207 depicted in FIG. 2. Although in FIG. 3, functions of the receiving unit 301 to the control unit 310 are depicted as functions of the CPU#0, the functions may be of another CPU other than the CPU#0.

The data processing apparatus 100 is configured to access the contents recorded in the memory unit 300 such as a parameter table 311, a thread table 312, an interrupt information table 313, and a CPU interrupt instruction state table 314. The memory unit 300 is a memory apparatus such as the RAM 204, the flash ROM 205, and the flash ROM 207.

The parameter table 311 records constants and thresholds used in the present embodiment. Details of the contents of the parameter table 311 will be described with reference to FIG. 5. The thread table 312 records information that indicates whether execution of the interrupt process will be inhibited. Details of the contents of the thread table 312 will be described with reference to FIG. 6. The interrupt information table 313 records information related to the interrupt process and for example, records the time when an interrupt request is received and the predicted time of the next interrupt request. Details of the contents of the interrupt information table 313 will be described with reference to FIG. 7. The CPU interrupt instruction state table 314 records states that indicate whether the interrupt process can be executed. Details of the contents of the CPU interrupt instruction state table 314 will be described with reference to FIG. 8.

The memory unit 300 records information that indicates whether an executable thread inhibits execution of the interrupt process. An executable thread is a thread that is in an executable state. For example, the memory unit 300 records to each thread, an identifier that indicates that the thread inhibits the interrupt process, or an identifier that indicates that the thread does not inhibit the interrupt process. Further, the memory unit 300 may records for all threads that have a possibility of being executed by the data processing apparatus 100, information that indicates whether the thread inhibits the interrupt process.

The receiving unit 301 receives interrupt requests that are triggers for execution of the interrupt process. For example, when the user manipulates the keyboard 211, the receiving unit 301 receives an interrupt request from the CPU connected to the interrupt controller 202. The processor is the CPU#0, for example. The function of the receiving unit 301 enables the data processing apparatus 100 to discriminate triggers causing execution of the interrupt process. Received information is recorded to a recording area such as in the RAM 204, the flash ROM 205, and the flash ROM 207.

The storing unit 302 stores to a recording area, the time at which an interrupt request is received by the receiving unit 301. For example, if an interrupt request is received by the receiving unit 301 at 12:00:10, the storing unit 302 records 12:00:10. Operation of the storing unit 302 enables the data processing apparatus 100 to refer to the times at which past interrupt requests were received.

If the CPU has received an interrupt request, the calculating unit 303 calculates a predicted time at which the next interrupt request is to be received, based on the time at which the interrupt request was received and particular time information read out from a recording area. The particular time information may be, for example, a given period, the time at which the previous interrupt request was received, or an interval at which past interrupt requests were received.

As a calculation method of the predicted time, the calculating unit 303 may add a given period to the time at which an interrupt request is received and regard the resulting time as the predicted time, for example. Further, for example, the calculating unit 303 may add to the time at which an interrupt request is received, the difference of the time at which the interrupt request is received and the time recorded to a recording area by the storing unit 302 as the time at which the previous interrupt request was received, and regard the resulting time as the predicted time. Further, the calculating unit 303 may add to the time at which an interrupt request is received, the average of the interval at which past interrupt requests were received and the difference of the time at which the interrupt request is received and the time recorded to a recording area by the storing unit 302 as the time at which the previous interrupt request was received. Concerning the average, the calculating unit 303 may obtain a weighted average by using, as a weight, a count of the interrupt requests received at the interval at which past interrupt requests were received.

For example, 12:00:10 is stored in a recording area as the time at which an interrupt request was received and an interrupt request is received at 12:00:20. In this case, the calculating unit 303 calculates the predicted time as 12:00:20+(12:00:20−12:00:10)=12:00:30. Operation of the calculating unit 303 enables the data processing apparatus 100 to predict an occurrence time at which an interrupt request is to occur next. The calculated predicted time is recorded to a recording area such as in the RAM 204, the flash ROM 205, and the flash ROM 207.

The detecting unit 304 detects a thread to be executed by the CPU, among executable threads at the CPU. For example, the detecting unit 304 detects a bus occupying thread. When multiple CPUs are present, the detecting unit 304 may detect a thread to be executed by any one of the CPUs. For example, among the CPU#0 to the CPU#n, the detecting unit 304 detects a thread to be executed by the CPU#0.

The function of the detecting unit 304 enables the data processing apparatus 100 obtain a timing to detect whether there is a possibility of the interrupt process being inhibited. Identification information, a pointer, etc. of a detected thread is recorded to a recording area such as in the RAM 204, the flash ROM 205, and the flash ROM 207.

The obtaining unit 305 obtains an access count of the number of times that the CPU accesses the bus 101 consequent to the execution of an executable thread. As a method of obtaining the access count of the bus 101, for example, the bus arbitration circuit 212 may count the number of accesses, and when multiple CPUs access the bus 101, the bus arbitration circuit 212 may count the number of accesses passing through the bus 101 from an access source address. Further, the obtaining unit 305 obtains an interrupt-prohibit-instruction execution count of the number of interrupt prohibit instructions executed by the CPU consequent to the execution of an executable thread. For example, the obtaining unit 305 obtains an execution count of interrupt prohibit instructions counted by the CPU#0. Obtained information is recorded to a recording area such as in the RAM 204, the flash ROM 205, and the flash ROM 207.

If a thread has been detected by the detecting unit 304, the judging unit 306 judges based on the predicted time calculated by the calculating unit 303 and the current time, whether there is a possibility of the interrupt process being executed while the detected thread is under execution.

For example, the judging unit 306 judges that there is a possibility of the interrupt process being executed while the detected thread is under execution, when the current time is between a time that is the predicted time less a threshold and a time that is the predicted time plus the threshold. Further, the judging unit 306 may judge that there is a possibility of the interrupt process being executed while the detected thread is under operation, when a time that is the predicted time plus the time of the time slice when the thread is switched is between a time that is the predicted time less the threshold and a time that is the predicted time plus the threshold.

For example, the calculating unit 303 is assumed to have calculated the predicted time as 12:00:20; the detecting unit 304 is assumed to detect a bus occupying thread at 12:00:19.5, and the threshold is assumed to be 0.5[second]. In this case, the judging unit 306 judges that there is a possibility of the interrupt process being executed while the detected thread is under execution because 12:00:20−0.5=12:00:19.5.

The judging unit 306 may refer to information that is recorded in the memory unit 300 and indicates whether a thread inhibits execution of the interrupt process to judge whether the detected thread will inhibit execution of the interrupt process. For example, when an identifier that indicates inhibition of execution of the interrupt process is recorded for the detected thread, the judging unit 306 judges that execution of the interrupt process will be inhibited.

The judging unit 306 may judge whether the detected thread will inhibit execution of the interrupt process, based on the access count obtained by the obtaining unit 305. For example, when the obtained access count is greater than or equal to a threshold, the judging unit 306 judges that execution of the interrupt process will be inhibited. If configuration is such that the obtaining unit 305 obtains the access count for unit time periods and calculates an average access count, when an access count that exceeds the average is obtained, the judging unit 306 judges that the detected thread will inhibit execution of the interrupt process.

The judging unit 306 may judge whether the detected thread will inhibit execution of the interrupt process, based on the interrupt-prohibit-instruction execution count obtained by the obtaining unit 305. For example, if the obtained interrupt-prohibit-instruction execution count is greater than or equal to a threshold, the judging unit 306 may judge that execution of the interrupt process will be inhibited. Here, the threshold is a value specified by the designer or user of the data processing apparatus 100, for example. Alternatively, the obtaining unit 305 obtains the interrupt-prohibit-instruction execution count for unit time periods and calculates an average interrupt-prohibit-instruction execution count. Subsequently, when an interrupt-prohibit-instruction execution count that exceeds the average is obtained, the judging unit 306 may judge that the detected thread will inhibit execution of the interrupt process.

Operation of the judging unit 306 enables the data processing apparatus 100 to judge whether to execute a detected thread. Judgment results are recorded to a recording area such as in the RAM 204, the flash ROM 205, and the flash ROM 207.

The deciding unit 307 decides whether to execute the detected thread on the CPU, based on the judgment results of the judging unit 306. For example, if the judging unit 306 has judged that there is no possibility of the interrupt process being executed while the detected thread is under execution, the deciding unit 307 decides to execute the detected thread on the CPU. If the judging unit 306 has judged that there is a possibility of the interrupt process being executed while the detected thread is under execution, the deciding unit 307 decides to not execute the detected thread on the CPU. If the judging unit 306 judges that the detected thread will not inhibit execution of the interrupt process, the deciding unit 307 decides to execute the detected thread on the CPU.

If the judging unit 306 judges that there is a possibility of the interrupt process being executed while the detected thread is under execution and that the detected thread will inhibit execution of the interrupt process, the deciding unit 307 may decide to not execute the detected thread on the CPU.

The judging unit 306 is assumed to judge that there is a possibility of the interrupt process being executed while the detected thread is under execution, and is further assumed to judge based on the interrupt-prohibit-instruction execution count, that the detected thread will inhibit execution of the interrupt process. In this case, the deciding unit 307 may decide to execute the detected thread or the interrupt process on any one of the CPUs and to execute the other on another CPU.

For example, the judging unit 306 is assumed to judge that the interrupt-prohibit-instruction execution count of the detected thread is greater than or equal to a threshold and that execution of the interrupt process will be inhibited. In this case, for example, the deciding unit 307 decides to execute the detected thread on the CPU#0 and decides to execute the interrupt process on the CPU#1. Further, the deciding unit 307 may decide to execute the detected thread on the CPU#1 and to execute the interrupt process on the CPU#0. Decision results are recorded to a recording area such as in the RAM 204, the flash ROM 205, and the flash ROM 207.

The executing unit 308 executes the detected thread on the CPU, based on the decision results of the deciding unit 307. For example, if the deciding unit 307 decides to execute the detected thread, the executing unit 308 executes the detected thread on the CPU#0.

If the deciding unit 307 decides to not execute the detected thread, the executing unit 308 may execute on the CPU, a thread among executable threads, excluding the detected thread. As the thread, the executing unit 308 may execute a low-priority thread, an idle thread that does nothing, etc.

The executing unit 308 may execute the detected thread or the interrupt process on any one of the CPUs, and execute the other on another CPU. For example, the executing unit 308 executes the detected thread on the CPU#0 and executes the interrupt process on the CPU#1.

When the receiving unit 301 receives an interrupt request, the determining unit 309 determines based on the time at which the interrupt request is received and particular time information read from a recording area, a time frame when the next interrupt request is to be received. The particular time information is the same as the particular time information of the calculating unit 303 and therefore, description thereof is omitted. As a method of determining the time frame, the determining unit 309, for example, as a calculation method of the predicted time, may determine a period from a time that is the time at which the interrupt request is received less a given period, until a time that is the time at which the interrupt request is received plus the given period, to be the time frame when the next interrupt request is to be received. Further, for example, the determining unit 309 may determine, as the time frame, a period from a time that is the time when the interrupt request is received less a difference of the time at which the interrupt request is received and a time stored in a recording area of the storing unit 302, until a time that is the time when the interrupt request is received plus the difference.

The function of the determining unit 309 enables the data processing apparatus 100 to obtain a time frame when an interrupt request will next occur. Information concerning determined time frames is recorded to a recording area such as in the RAM 204, the flash ROM 205, and the flash ROM 207.

The control unit 310 controls the transmitting apparatus such that during data transmission, a divisor for dividing the data unit for transmission by the transmitting apparatus during the time frame determined by the determining unit 309 is greater than the divisor at a time point outside the time frame. The transmitting apparatus is an apparatus that transmits data and for example, is the DMA controller 208. For example, when the DMA controller 208 is transmitting data without dividing the data, the control unit 310 performs control such that during the determined time frame, the data are divided into 2 and transmitted. The function of the control unit 310 enables the data processing apparatus 100 to make the data units for transmission smaller during the time frame when an interrupt request has been predicted to occur, whereby the interrupt process can be easily executed.

Figure 4:
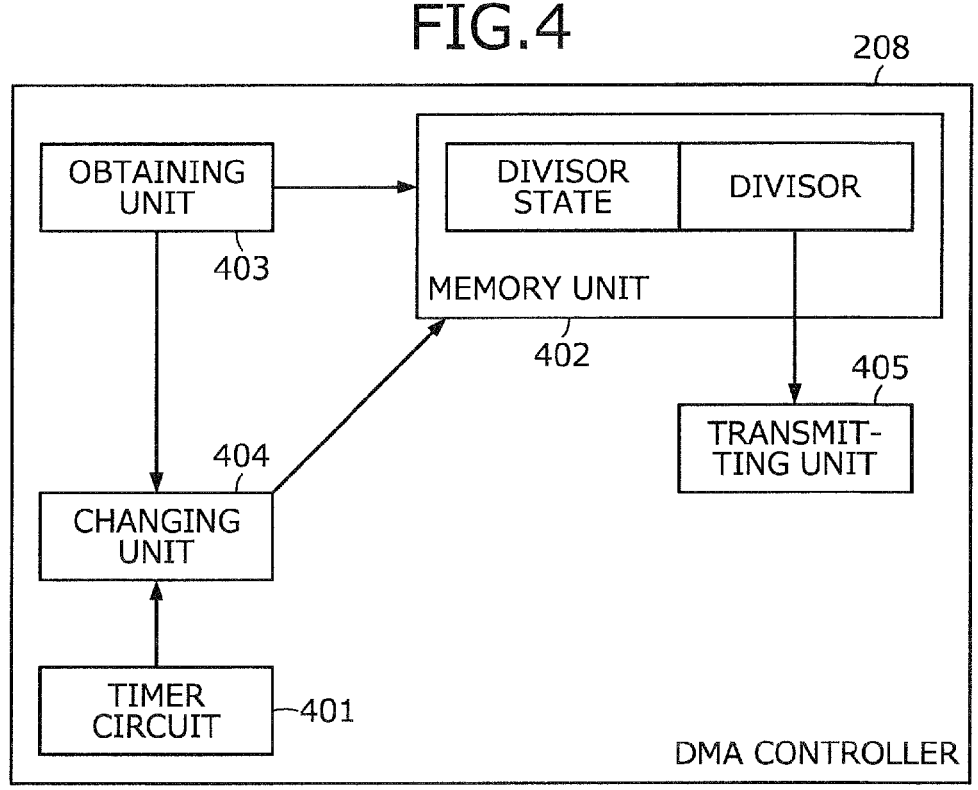
FIG. 4 is a block diagram of an example of a functional configuration of a DMA controller.

FIG. 4 is a block diagram of an example of a functional configuration of the DMA controller. The DMA controller 208 includes a timer circuit 401, a memory unit 402, an obtaining unit 403, a changing unit 404, and a transmitting unit 405.

The timer circuit 401 is a circuit that measures the elapsed time. The timer circuit 401, for example, upon receiving a measurement start request, measures the time that elapses and when a given time has elapsed, issues a timer interrupt to the CPU#0.

The memory unit 402 records the divisor for dividing data into data units for transmission. For example, if no time frame during which an interrupt request is to be received from the CPU#0 has been received, the memory unit 402 records 1 as the divisor. Further, the memory unit 402 records the state of the divisor as an identifier that indicates that the divisor increases, or an identifier that indicates that the divisor decreases. For example, "0" is used as the identifier that indicates that the divisor increases and "1" is used as the identifier that indicates that the divisor decreases. The function of the memory unit 402 enables the DMA controller 208 to record the current state of the divisor.

The obtaining unit 403 obtains from a receiving apparatus, the time frame during which an interrupt request is to be received at the receiving apparatus. The receiving apparatus of the interrupt request is, for example, a CPU. For example, the obtaining unit 403 obtains 12:00:19.5 to 12:00:20.5 as the time frame during which an interrupt request is to be received. The obtaining unit 403 may further obtain the predicted time when an interrupt request is to be received. For example, the obtaining unit 403 receives 12:00:20 as the predicted time. The function of the obtaining unit 403 enables the DMA controller 208 to obtain a time frame for dividing data into data units for transmission.

The changing unit 404 changes the divisor during the time frame obtained by the obtaining unit 403 to be greater than the divisor recorded in the memory unit 402. For example, the divisor is assumed to be 1 when no time frame during which an interrupt request is to be received has been received and the obtaining unit 403 is assumed to obtain 12:00:19.5 to 12:00:20.5 as a time frame during which an interrupt request is to be received. In this case, the changing unit 404 changes the divisor for dividing data into data units for transmission from 12:00:19.5 to 12:00:20.5 to 2. The changing unit 404 may further change the divisor in response to completion notification from the timer circuit 401.

During the time frame, from the start time of the time frame until the predicted time, the changing unit 404 changes the divisor to be a value greater than that before the change, and during the time frame, from the predicted time until the end time of the time frame, the changing unit 404 changes the divisor to be a value smaller than that before the change.

For example, the start time is assumed to be 12:00:19.5; the end time is assumed to be 12:00:20.5; and the predicted time is assumed to be 12:00:20. First, at 12:00:19.5, the changing unit 404 changes the divisor to 2. Next, at 12:00:19.75, the changing unit 404 changes the divisor to 3. At 12:00:20.25, the changing unit 404 changes the divisor to 2. Finally, at 12:00:20.5, the changing unit 404 changes the divisor to 1. Thus, by the function of the changing unit 404, the DMA controller 208 sets a large divisor for the time when an interrupt request is predicted to occur, whereby at the predicted time, a release count of the number of times that the bus 101 is released is increased and the interrupt process is easily executed.

The transmitting unit 405 divides the data by the divisor that has been changed by the changing unit 404 and transmits the data. For example, if the divisor has been changed to 2 by the changing unit 404, the transmitting unit 405 divides the data unit by 2.

Figure 5:
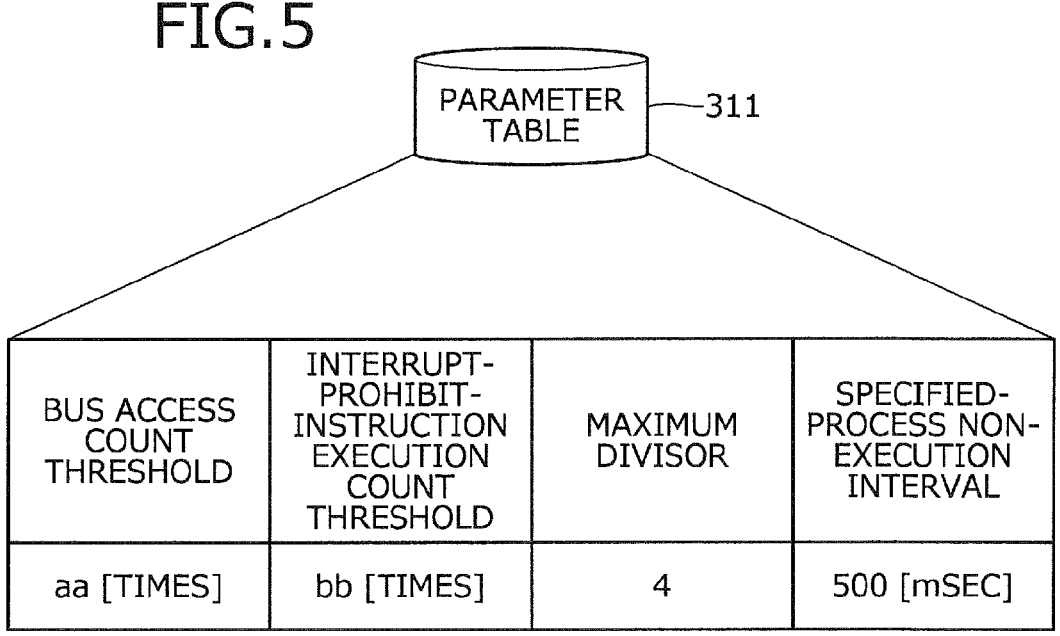
FIG. 5 is a diagram depicting an example of a parameter table.

FIG. 5 is a diagram depicting an example of the parameter table. The parameter table 311 has 4 fields respectively for a bus access count threshold, a interrupt-prohibit-instruction execution count threshold, a maximum divisor, and a specified-process non-execution interval. The bus access count threshold field stores 1 threshold for judging whether a thread is an interrupt inhibiting cause. For example, a thread that accesses the bus 101 a number of times greater than or equal to the value stored in the bus access count threshold field is judged to be a thread that inhibits execution of the interrupt process.

The interrupt-prohibit-instruction execution count threshold field stores 1 threshold for judging whether a thread scheduled for execution is an interrupt inhibiting cause. For example, a thread that has executed an interrupt prohibit instruction a number of times that is greater than or equal to the value stored in the interrupt-prohibit-instruction execution count threshold field is judged to be a thread that inhibits execution of the interrupt process. The maximum divisor field stores the maximum divisor for data transmission to prevent bus occupation. The specified-process non-execution interval field stores a value related to a period for improving interrupt responsiveness and for judging whether a thread scheduled for execution is an interrupt inhibiting cause.

Figure 6:
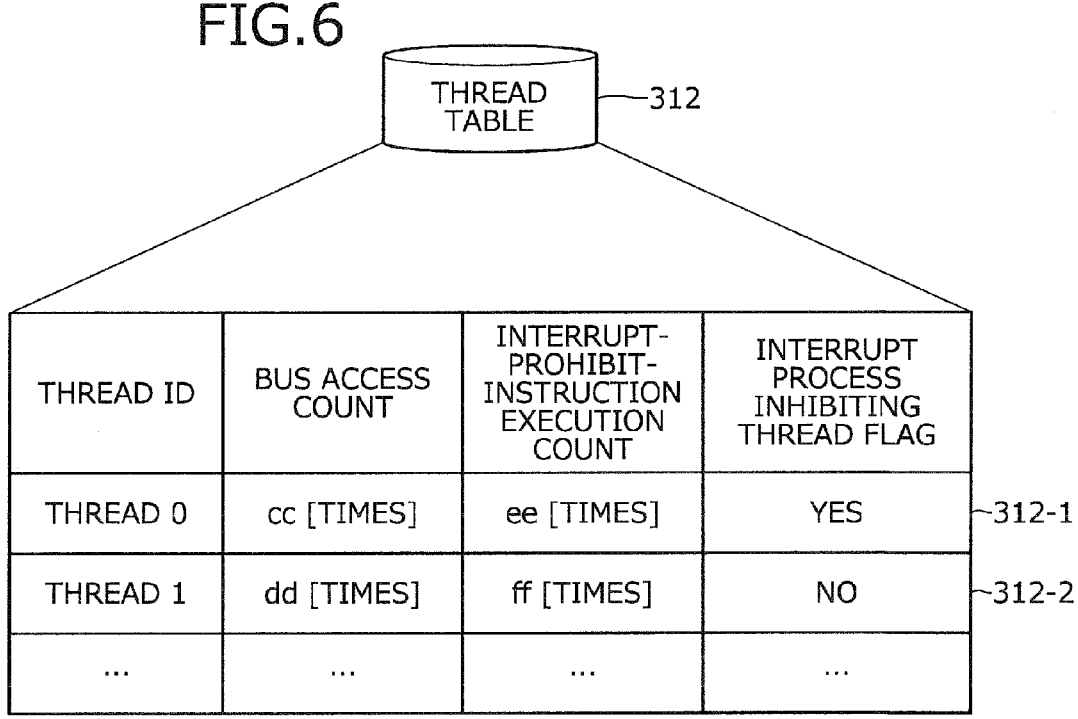
FIG. 6 is a diagram depicting an example of the contents of a thread table.

FIG. 6 is a diagram depicting an example of the contents of the thread table. The thread table 312 records to each thread, information that indicates whether the thread inhibits execution of the interrupt process. The thread table 312 depicted in FIG. 6 has records 312-1 and 312-2.

The thread table 312 has 4 fields respectively for a thread ID, the bus access count, the interrupt-prohibit-instruction execution count, and an interrupt process inhibiting thread flag. The thread ID field stores identification information of a thread that is an interrupt inhibiting cause. The bus access count field stores the number of times that a thread that is an interrupt inhibiting cause has accessed the bus 101. The interrupt-prohibit-instruction execution count field stores the number of times that a thread that is an interrupt inhibiting cause has executed an interrupt prohibit instruction.

The interrupt process inhibiting thread flag field stores an identifier that indicates whether a thread inhibits execution of the interrupt process. For example, "Yes" is an identifier that indicates that execution of the interrupt process is inhibited, and "No" is an identifier that indicates that execution of the interrupt process is not inhibited. If a thread for which the interrupt process inhibiting thread flag is "Yes" is to be executed, the data processing apparatus 100 without executing the thread, transfers execution privilege to another thread. The setting of the interrupt process inhibiting thread flag may be determined by the designer at the time of design of the data processing apparatus 100, or may be set by the user of the data processing apparatus 100.

For example, the record 312-1 indicates that for thread 0, the bus access count is cc times, the interrupt-prohibit-instruction execution count is ee times, and further indicates that thread 0 is a thread that inhibits execution of the interrupt process. For example, if cc times is greater than or equal to the value aa times in the bus access count threshold field depicted in FIG. 5, thread 0 is a bus occupying thread. Similarly, the record 312-2 indicates that for thread 1, the bus access count is dd times, the interrupt-prohibit-instruction execution count is ff times, and further indicates that thread 1 is a thread that does not inhibit the interrupt process. For example, if ff times is greater than or equal to the value bb times of the interrupt-prohibit-instruction execution count threshold depicted in the FIG. 5, thread 1 is an interrupt prohibiting thread.

Figure 7:
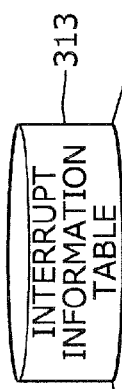
FIG. 7 is a diagram depicting an example of the contents of an interrupt information table.

FIG. 7 is a diagram depicting an example of the contents of the interrupt information table. The interrupt information table 313 records information related to 1 interrupt process as 1 record. The interrupt information table 313 depicted in FIG. 7 has records 313-1 and 313-2.

The interrupt information table 313 has 7 fields respectively for an interrupt ID, a thread ID, operation contents, an interrupt interval, a previous interrupt time, a next interrupt predicted time, and interrupt count within a constant period. The interrupt ID field stores identification information of the interrupt process. The thread ID field stores the thread ID that corresponds to the interrupt ID field. The operation contents field stores operation contents of the user. The interrupt interval field stores a time interval at which an interrupt request occurs. The previous interrupt time field stores the time at which the previous interrupt request occurred. The predicted time of the next interrupt field stores the predicted time at which the next interrupt request will occur. The interrupt count within a constant period field stores the number of times an interrupt request occurs within a constant period.

For example, the record 313-1 indicates that the interrupt process indicated by the interrupt ID int#0 belongs to thread 2 and that the operation contents performed by the interrupt process is the skipping of a track of music being played. The record 313-1 further indicates that the interrupt interval is 10 seconds, the previous interrupt request occurred at 12:00:10, and the predicted time of the next interrupt request is 12:00:20.

Figure 8:
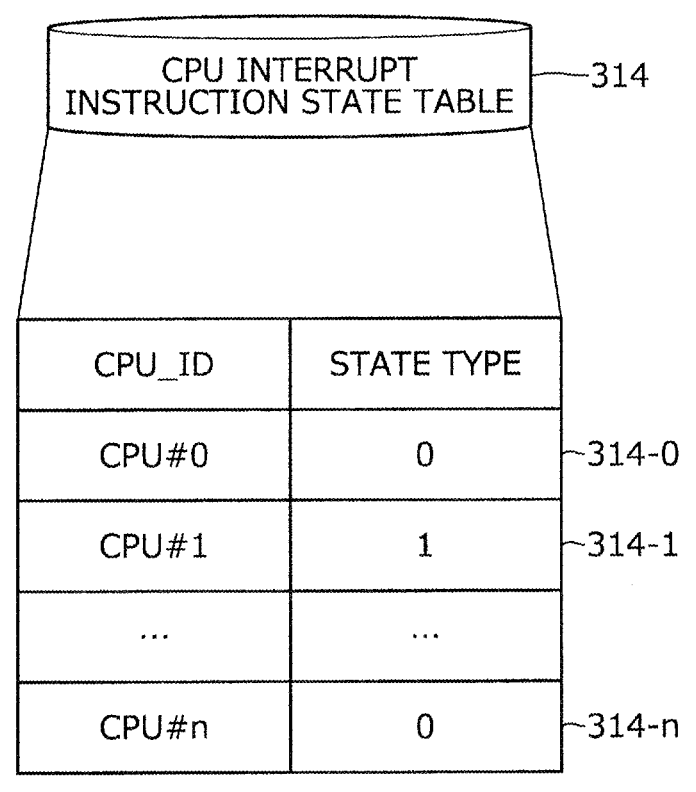

FIG. 8 is a diagram depicting an example of the CPU interrupt instruction state table. The CPU interrupt instruction state table 314 records to each CPU, whether the CPU can execute the interrupt process. In the CPU interrupt instruction state table 314, records 314-0 to 314-n are registered. The CPU interrupt instruction state table 314 has 2 fields respectively for a CPU_ID and a state type. The CPU_ID field stores identification information of a CPU. The state type field stores an identifier that indicates whether a CPU is in a state enabling execution of the interrupt process. For example, the state type field stores an identifier "0" that indicates that the CPU is executing an interrupt prohibit instruction and therefore, is in a state that does not enable execution of the interrupt process, or an identifier "1" that indicates that the CPU is not executing an interrupt prohibit instruction and therefore, is in a state that enables execution of the interrupt process.

For example, the record 314-0 indicates that the CPU#0 is in a state that does not enable execution of the interrupt process. Further, the record 314-1 indicates that the CPU#1 is in a state that enables execution of the interrupt process. Similarly, the record 314-n indicates that the CPU#n is in a state that does not enable execution of the interrupt process.

Figure 9:
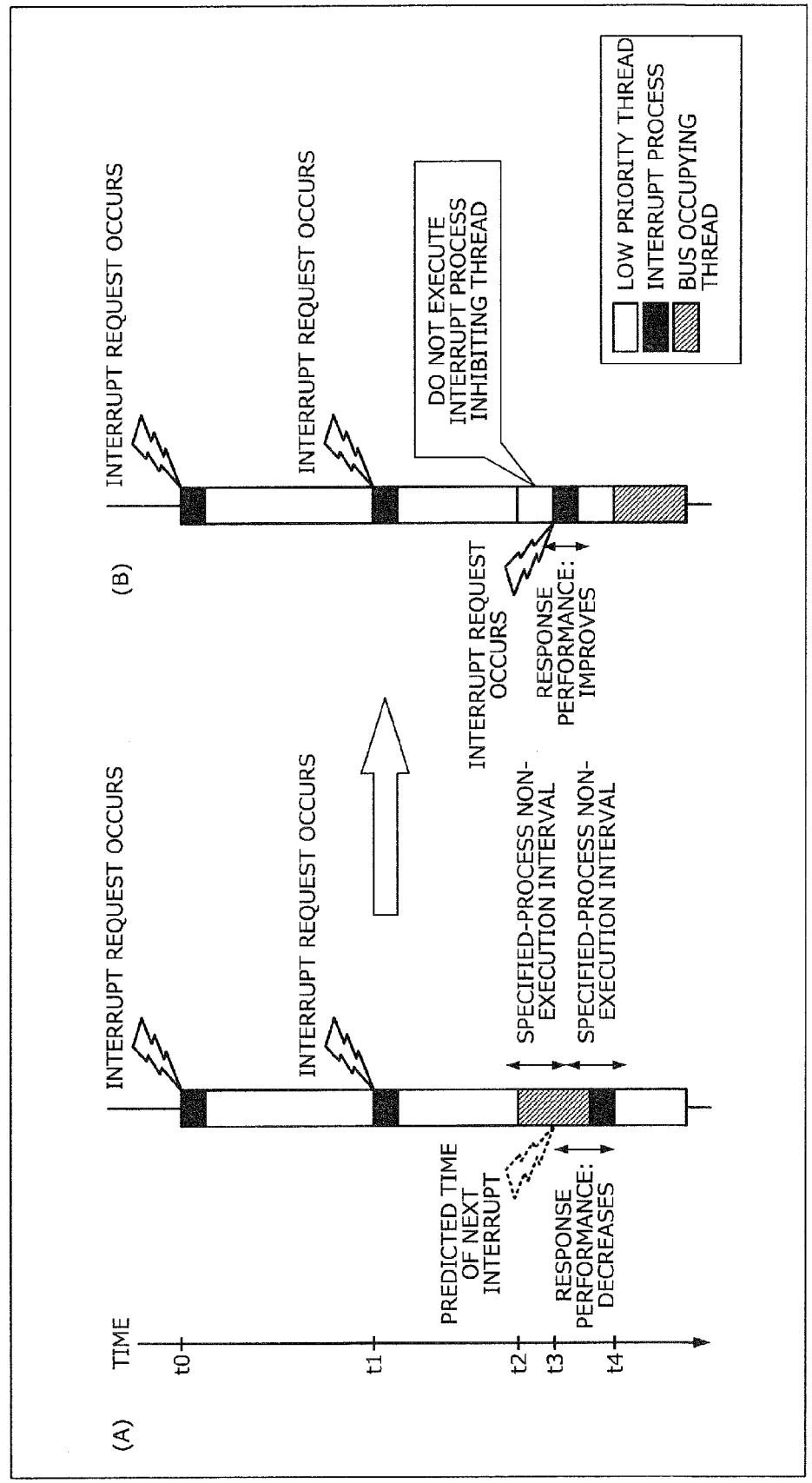
FIG. 9 is a diagram depicting a first example of a method of excluding an interrupt inhibiting cause.
Figure 10:
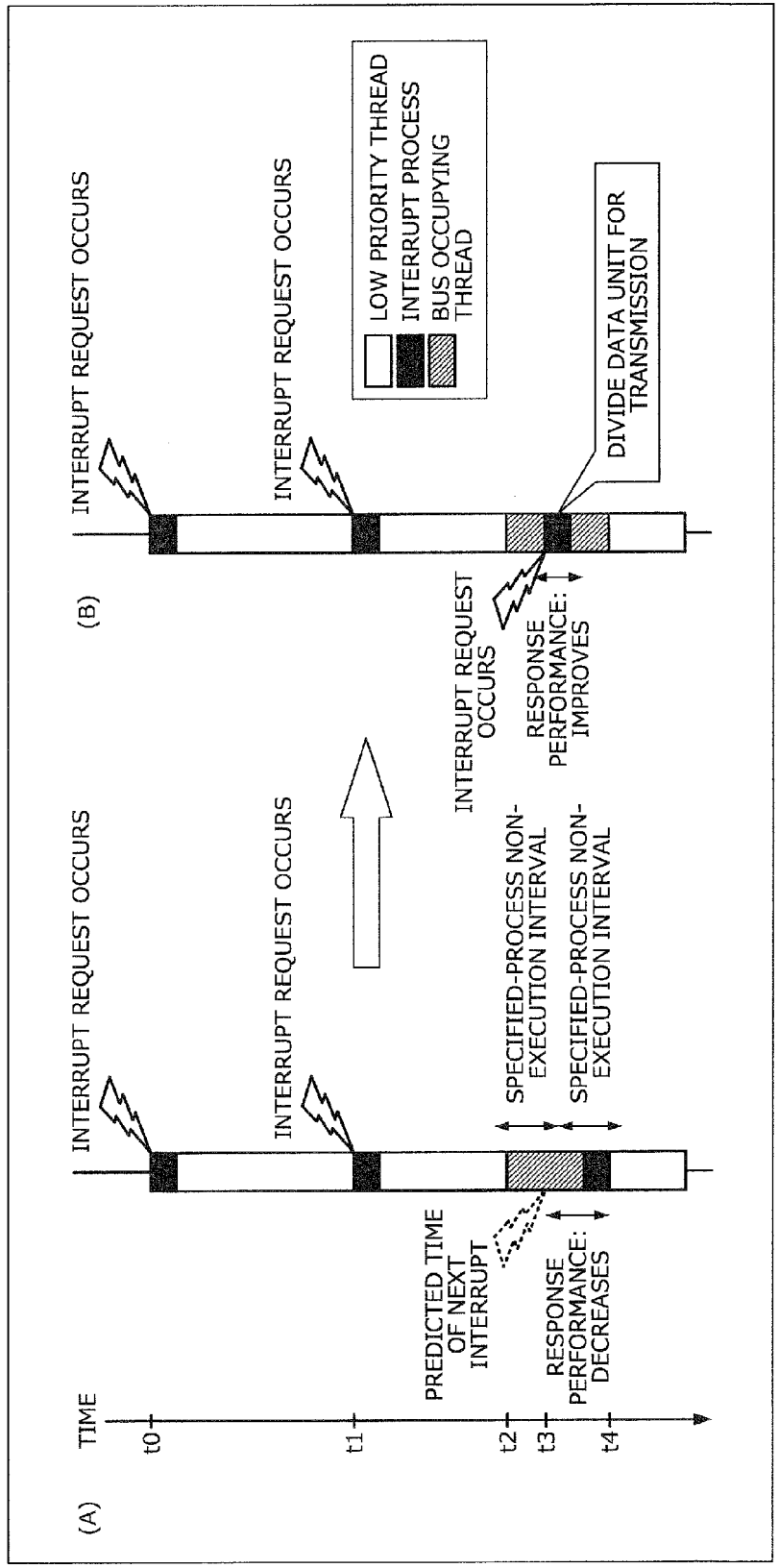
FIG. 10 is a diagram depicting a second example of a method of excluding the interrupt inhibiting cause.
Figure 11:
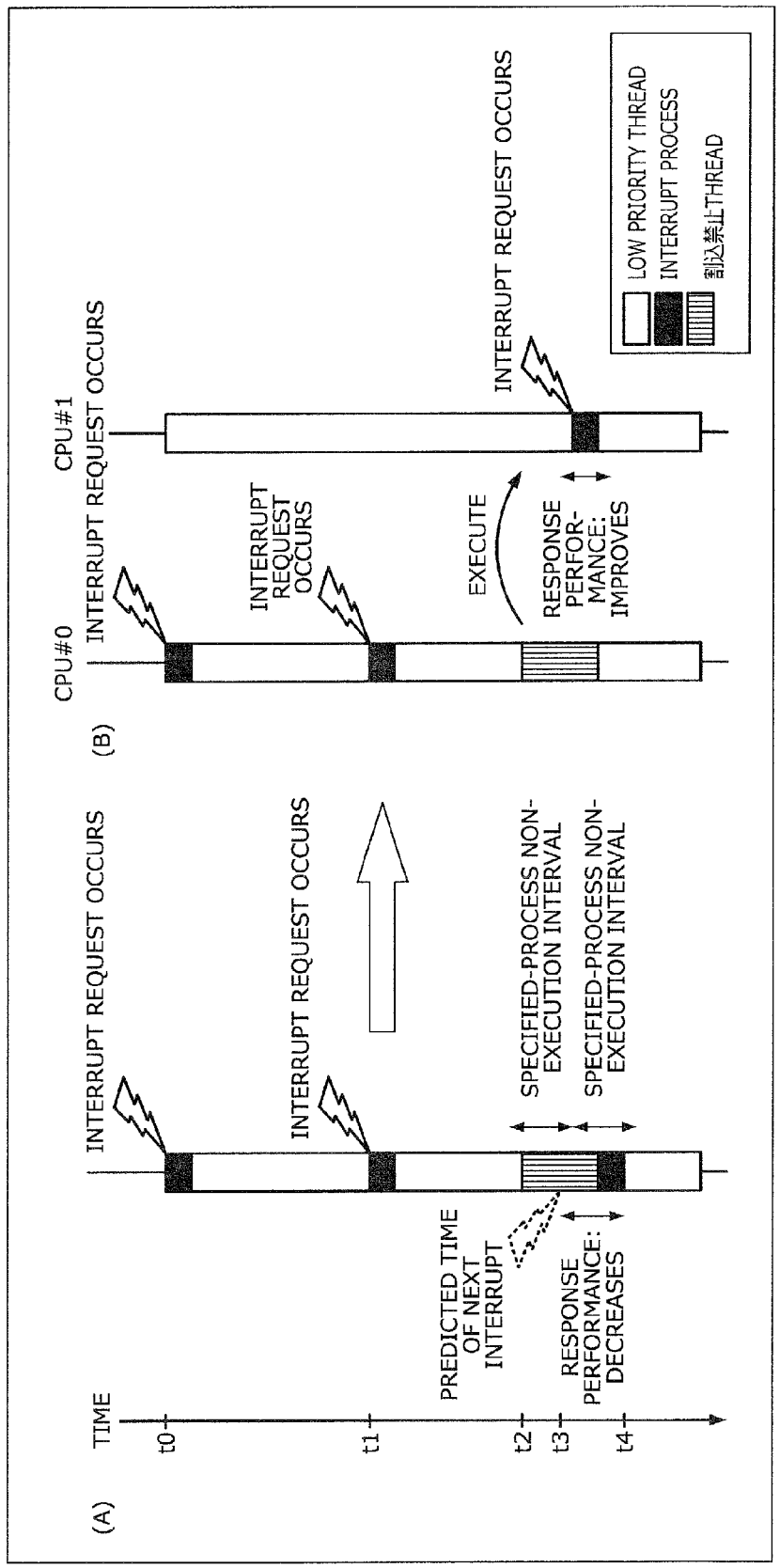
FIG. 11 is a diagram depicting a third example of a method of excluding the interrupt inhibiting cause.

FIGS. 9, 10, and 11 present 3 examples related to a method of excluding an interrupt inhibiting cause. In FIGS. 9 to 11, as common settings, respectively at times t0 and t1, an interrupt request occurs; and the CPU#0 calculates time t3 as the predicted time when the next interrupt request will occur. Further, in FIGS. 9 to 11, an interrupt request is assumed to occur at the predicted time (time t3). (A) of FIGS. 9 to 11 depicts the execution state of a thread in a case where the interrupt inhibiting cause is not excluded and (B) of FIGS. 9 to 11 depicts the execution state of a thread in a case where the interrupt inhibiting cause is excluded.

FIG. 9 is a diagram depicting a first example of a method of excluding the interrupt inhibiting cause. In FIG. 9, as a first example of a method of excluding the interrupt inhibiting cause, the execution time of a bus occupying thread is scheduled to not overlap the time at which an interrupt request occurs.

At time t2 in (A) of FIG. 9, the CPU#0 judges whether the predicted time of the next interrupt–the specified-process non-execution interval≤the current time≤next interrupt predicted time+the specified-process non-execution interval is true. The state depicted in FIG. 9 satisfies the condition. Here, (A) of FIG. 9 depicts a case where a bus occupying thread is executed at time t2 and (B) of FIG. 9 depicts a case where the bus occupying thread is not executed at time t2, based on judgment results.

In (A) of FIG. 9, although an interrupt request occurs at time t3, the bus 101 is occupied by the bus occupying thread and therefore, execution of the interrupt process corresponding to the interrupt request is delayed and the response performance drops. In (B) of FIG. 9, an interrupt request occurs at time t3 and the interrupt process corresponding to the interrupt request is executed at time t3 and therefore, the response performance improves.

FIG. 10 is a diagram depicting a second example of a method of excluding the interrupt inhibiting cause. In FIG. 10, as a second example of a method of excluding the interrupt inhibiting cause, the data unit of the DMA controller 208 is divided at the time when which an interrupt request occurs.

At time t2 in (B) of FIG. 10, the CPU#0 judges whether the predicted time of the next interrupt–the specified-process non-execution interval≤the current time≤next interrupt predicted time+the specified-process non-execution interval is true. The state depicted in FIG. 10 satisfies the condition. Here, (A) of FIG. 10 depicts a case where the data unit of the DMA controller 208 is not divided and (B) of FIG. 10 depicts a case where the data unit of the DMA controller 208 is divided, based on judgment results.

In (A) of FIG. 10, although an interrupt request occurs at time t3, the bus 101 is occupied by the DMA controller 208 and therefore, execution of the interrupt process corresponding to the interrupt request is delayed and the response performance drops. In (B) of FIG. 10, an interrupt request occurs at time t3 and since the DMA controller 208 is not occupying the bus 101, the interrupt process corresponding to the interrupt request is executed at time t3, whereby the response performance improves.

FIG. 11 is a diagram depicting a third example of a method of excluding the interrupt inhibiting cause. In FIG. 11, as a third example of a method of excluding the interrupt inhibiting cause, at the time at which an interrupt request occurs, the interrupt process corresponding to the interrupt request and an interrupt prohibiting thread are respectively executed of different CPUs.

At time t2 in (A) of FIG. 11, the CPU#0 judges whether the predicted time of the next interrupt–the specified-process non-execution interval≤the current time≤next interrupt predicted time+the specified-process non-execution interval is true. (A) of FIG. 11 depicts a case where the interrupt process and the interrupt prohibiting thread are executed on the same CPU and (B) of FIG. 11 depicts a case where the interrupt process and the interrupt prohibiting thread are executed on different CPUs, based on judgment results.

In (A) of FIG. 11, although an interrupt request occurs at time t3, an interrupt prohibit instruction is being executed and therefore, the interrupt process corresponding to the interrupt request is delayed and the response performance drops. In (B) of FIG. 11, although the CPU#0 is executing the interrupt prohibiting thread at the time t3, since the interrupt prohibit instruction is not being executed by the CPU#1, CPU#1 executes the interrupt process corresponding to the interrupt request, whereby the response performance improves.

Figure 12:
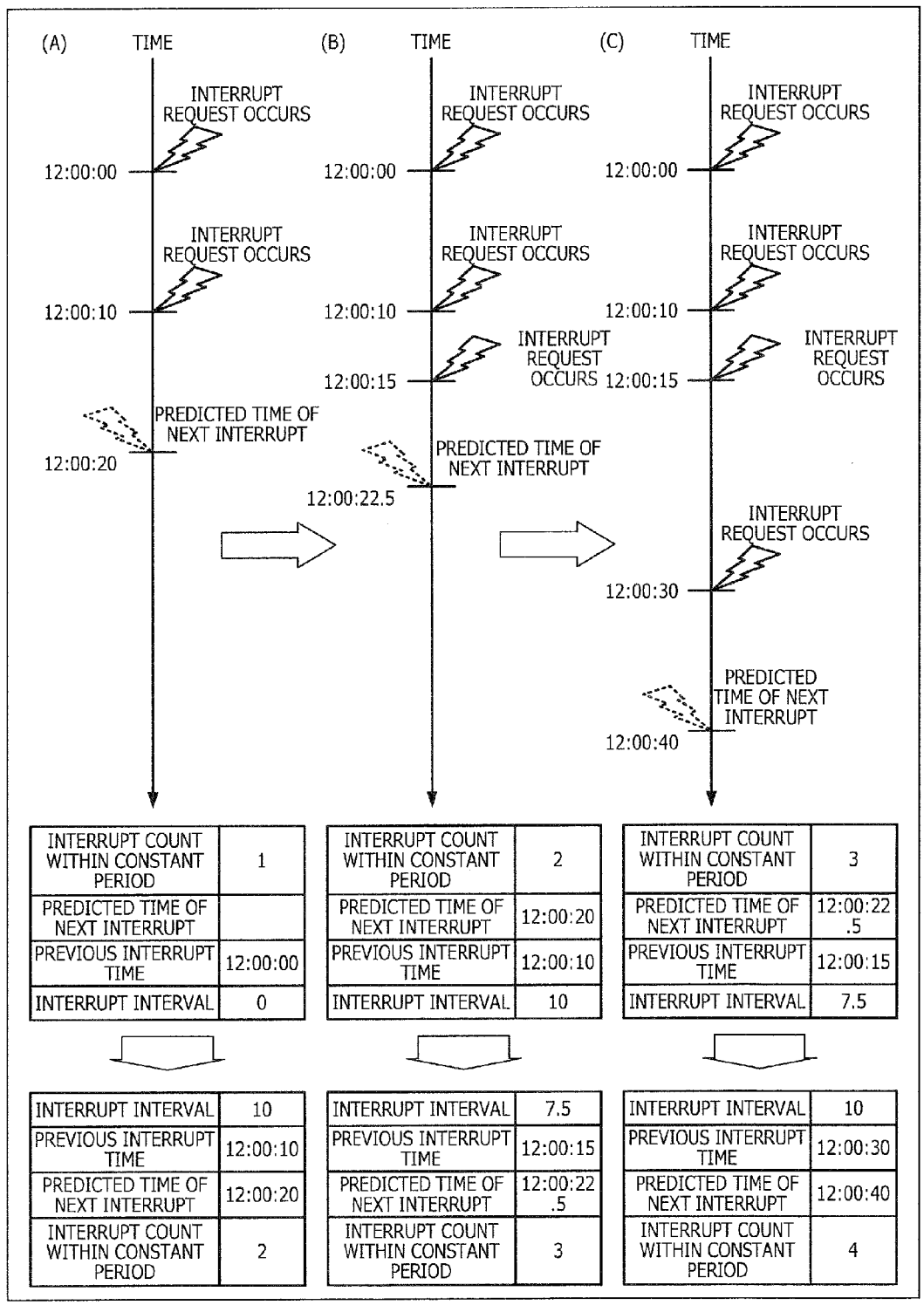
FIG. 12 is a diagram depicting a calculation example of a predicted time of a next interrupt.

FIG. 12 is a diagram depicting a calculation example of the predicted time of the next interrupt. As a calculation example of the predicted time of the next interrupt, the data processing apparatus 100 averages the occurrence interval of an interrupt request, when the same interrupt request occurs consecutively. The CPU#0 updates the interrupt interval field of the interrupt information table 313 with the result obtained from Equation (1).

$$\text{interrupt interval}=(\text{value of interrupt interval field} \times (\text{value of interrupt count within a constant period field})+(\text{current occurrence time}-\text{value of previous interrupt time field}))/\text{value of interrupt count within a constant period field} \quad (1)$$

The CPU#0 further calculates the predicted time of the next interrupt by Equation (2).

$$\text{next interrupt predicted time}=\text{current occurrence time}+\text{interrupt interval} \quad (2)$$

The CPU#0, without calculating Equation (1) the first time an interrupt request occurs, stores 0 into the interrupt interval field, stores the first occurrence time of the interrupt request into the previous interrupt time field, and stores 1 into the interrupt count within a constant period field. For example, if an interrupt request occurs at 12:00:00 while music is being played, the CPU#0 stores 12:00:00 into the previous interrupt time field.

Next, as indicated in (A) of FIG. 12, the interrupt request is assumed to occur at 12:00:10. Here, the CPU#0 uses Equation (1) to calculate the interrupt interval.

$$\text{interrupt interval}=(0\times(1-1)+(12:00:10-12:00:00))/1$$

↔ interrupt interval=10/1=10[second]

Therefore, the CPU#0 stores 10 into the interrupt interval field, stores the second occurrence time of the interrupt request into the previous interrupt time field, and increments by 1 and stores 2 into the interrupt count within a constant period field. The CPU#0 further calculates the predicted time of the next interrupt by Equation (2), as indicated below.

$$\text{next interrupt predicted time}=12:00:10+10$$

↔ next interrupt predicted time=12:00:20

Therefore, the CPU#0 stores 12:00:20 into the predicted time of the next interrupt field. In (B) of FIG. 12, from the state depicted in (A) of FIG. 12, the interrupt request is assumed to occur at 12:00:15. Here, the CPU#0 uses Equation (1) calculate the interrupt interval.

$$\text{interrupt interval}=(10\times(2-1)+(12:00:15-12:00:10))/2$$

↔ interrupt interval=(10+5)/2=7.5[second]

Therefore, the CPU#0 stores 7.5 into the interrupt interval field, stores the third occurrence time of the interrupt request into the previous interrupt time field, and increments by 1 and stores 3 into the interrupt count within a constant period field.

The CPU#0 further calculates the predicted time of the next interrupt by Equation (2), as indicated below.

$$\text{next interrupt predicted time}=12:00:15+7.5$$

↔ next interrupt predicted time=12:00:22.5

Therefore, the CPU#0 stores 12:00:22.5 into the predicted time of the next interrupt. In (C) of FIG. 12, from the state depicted in (B) of FIG. 12, the interrupt request is assumed to occur at 12:00:30. Here, the CPU#0 uses Equation (1) to calculate the interrupt interval.

$$\text{interrupt interval}=(7.5\times(3-1)+(12:00:30-12:00:15))/3$$

↔ interrupt interval=(15+15)/3=10[second]

Therefore, the CPU#0 stores 10 into the interrupt interval field, stores the fourth occurrence time of the interrupt request into the previous interrupt time field, and increments by 1 and stores 4 into the interrupt count within a constant period field. The CPU#0 further calculates the predicted time of the next interrupt by Equation (2), as indicated below.

$$\text{next interrupt predicted time}=12:00:30+10$$

↔ next interrupt predicted time=12:00:40

Therefore, the CPU#0 stores 12:00:40 into the predicted time of the next interrupt. Thus, the CPU#0 uses past interrupt occurrence times to calculate the predicted time of the next interrupt occurrence. Next, an example of data transmission division will be described.

Figure 13:
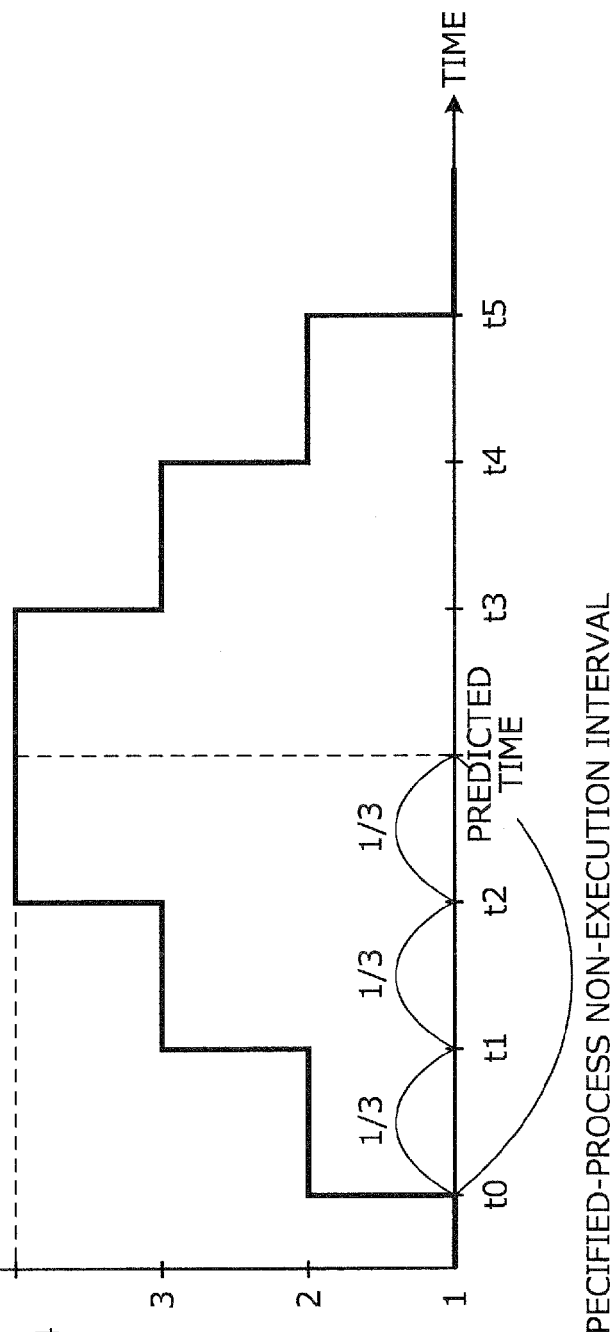
FIG. 13 is a diagram depicting an example of data transmission division of the DMA controller.

FIG. 13 is a diagram depicting an example of data transmission division of the DMA controller. In FIG. 13, description is given assuming the maximum divisor to be 4. First, before time t0, the DMA controller 208 performs data transmission without dividing the data.

At time t0, if the condition: the predicted time of the next interrupt−the specified-process non-execution interval≤the current time≤next interrupt predicted time+the specified-process non-execution interval, is satisfied, the CPU#0 sends to the DMA controller 208, a setting request for a setting to a division mode of a data transmission mode. Having received the setting request, the DMA controller 208 performs the data transmission by dividing the data by 2.

The DMA controller 208 divides the time from time t0 until the predicted time by the maximum divisor-1 and increases the divisor stepwise. In the example depicted in FIG. 13, the time from time t0 until the predicted time is assumed to be divided by 3, where an elapse of ⅓ of the time from time t0 is at t1 and an elapse of ⅔ of the time is at t2. Further, the DMA controller 208 is assumed to regard the elapse of ⅓ of the time after the predicted time to be at t3, an elapse of ⅔ of the time to be at t4, and the elapse of the specified-process non-execution interval from predicted time to be at t5.

At time t0, the DMA controller 208 sets the divisor to 2. As a result, from time t0 until time t1, the DMA controller 208 performs data transmission by dividing the data by 2. At time t1, the DMA controller 208 sets the divisor to 3. As a result, from time t1 until time t2, the DMA controller 208 performs data transmission by dividing the data by 3. At time t2, the DMA controller 208 sets the divisor to 4. As a result, from time t2 until time t3, the DMA controller 208 performs data transmission by dividing the data by 4.

At time t3, the DMA controller 208 sets the divisor to 3. As a result, from time t3 until time t4, the DMA controller 208 performs data transmission by dividing the data by 3. At time t4, the DMA controller 208 sets the divisor to 2. As a result, from time t4 until time t5, the DMA controller 208 performs data transmission by dividing the data by 2.

Thus, by setting the divisor at the predicted time to be the greatest value, the data processing apparatus 100 can increase the divisor near the predicted time when an interrupt request is most likely to occur, to easily respond to the interrupt request. In FIGS. 14 to 19, flowcharts of a procedure of an exclusion process for interrupt process inhibition will be described.

Figure 14:
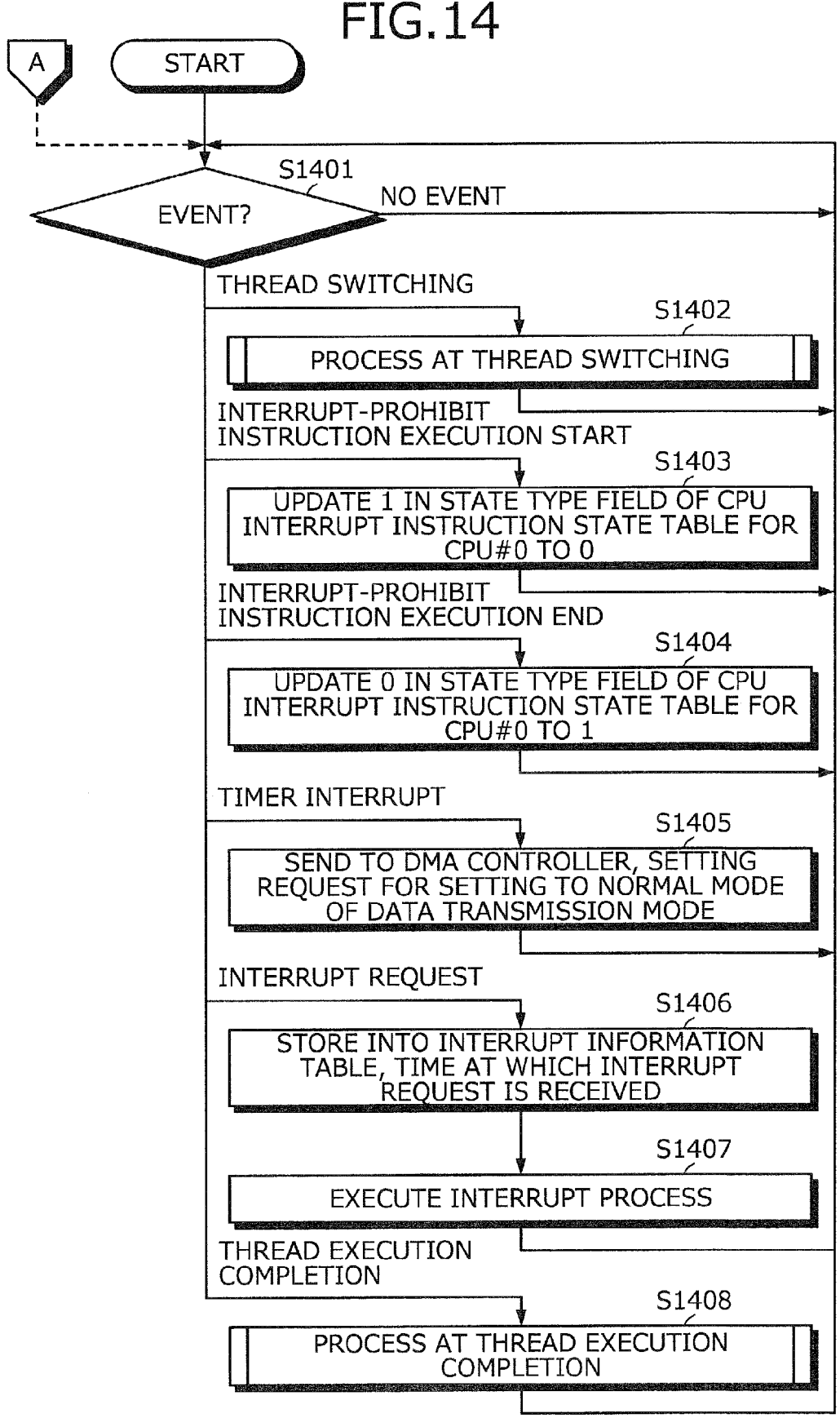
FIG. 14 is a flowchart that depicts one example of a procedure of an exclusion process of the interrupt inhibiting cause.

FIG. 14 is a flowchart that depicts one example of a procedure of an exclusion process of the interrupt inhibiting cause. The exclusion process for the interrupt inhibiting cause detects a thread that according to an event, inhibits an interrupt, and after the thread has ended, executes a completion process. The exclusion process for the interrupt inhibiting cause may be executed by any one of the CPU#0 to the CPU#n. However, in FIG. 14, a case will be described where the CPU#0 executes the exclusion process. The exclusion process for the interrupt inhibiting cause may be one part of a program for a scheduler, a program that receives an event of the completion of a thread that performs a thread switch from a scheduler.

The CPU#0 checks whether an event has been received (step S1401). If no event has been received (step S1401: no event), the CPU#0 transitions to the operation at step S1401 after the elapse of a given period. If thread switching event has been received, the CPU#0 executes a process at thread switching (step S1402), and returns to the operation at step S1401. Details of the process at thread switching will be described with reference to FIG. 15.

If an interrupt-prohibit instruction execution start event has been received (step S1401: interrupt-prohibit instruction execution start), the CPU#0 updates 1 in the state type field of the CPU interrupt instruction state table 314 for the CPU#0 to 0 (step S1403), and transitions to the operation at step S1401.

If an interrupt-prohibit instruction execution end event has been received (step S1401: interrupt-prohibit instruction execution end), the CPU#0 updates 0 in the state type field of the CPU interrupt instruction state table 314 for the CPU#0 to 1 (step S1404), and transitions to the operation at step S1401. Detection methods for an interrupt-prohibit instruction execution start and an interrupt-prohibit instruction execution end can be performed by the OS since the thread call an interrupt prohibit instruction in the Application Programming Interface (API).

If a timer interrupt event has been received (step S1401: timer interrupt), the CPU#0 sends to the DMA controller 208, a setting request for setting to a normal mode of the data transmission mode (step S1405), and transitions to the operation at step S1401. A timer interrupt sent by the timer circuit 401.

If an interrupt request event has been received (step S1401: interrupt request), the CPU#0 stores into the interrupt information table 313, the time at which the interrupt request is received (step S1406). The CPU#0 executes an interrupt process corresponding to the interrupt request (step S1407), and transitions to the operation at step S1401.

If a thread execution completion event has been received (step S1401: thread execution completion), the CPU#0 executes a process at thread execution completion (step S1408), and transitions to the operation at step S1401. Thus, by executing the exclusion process for the interrupt inhibiting cause depicted in FIG. 14, the data processing apparatus 100 can execute a process that corresponds to each event.

Figure 15:
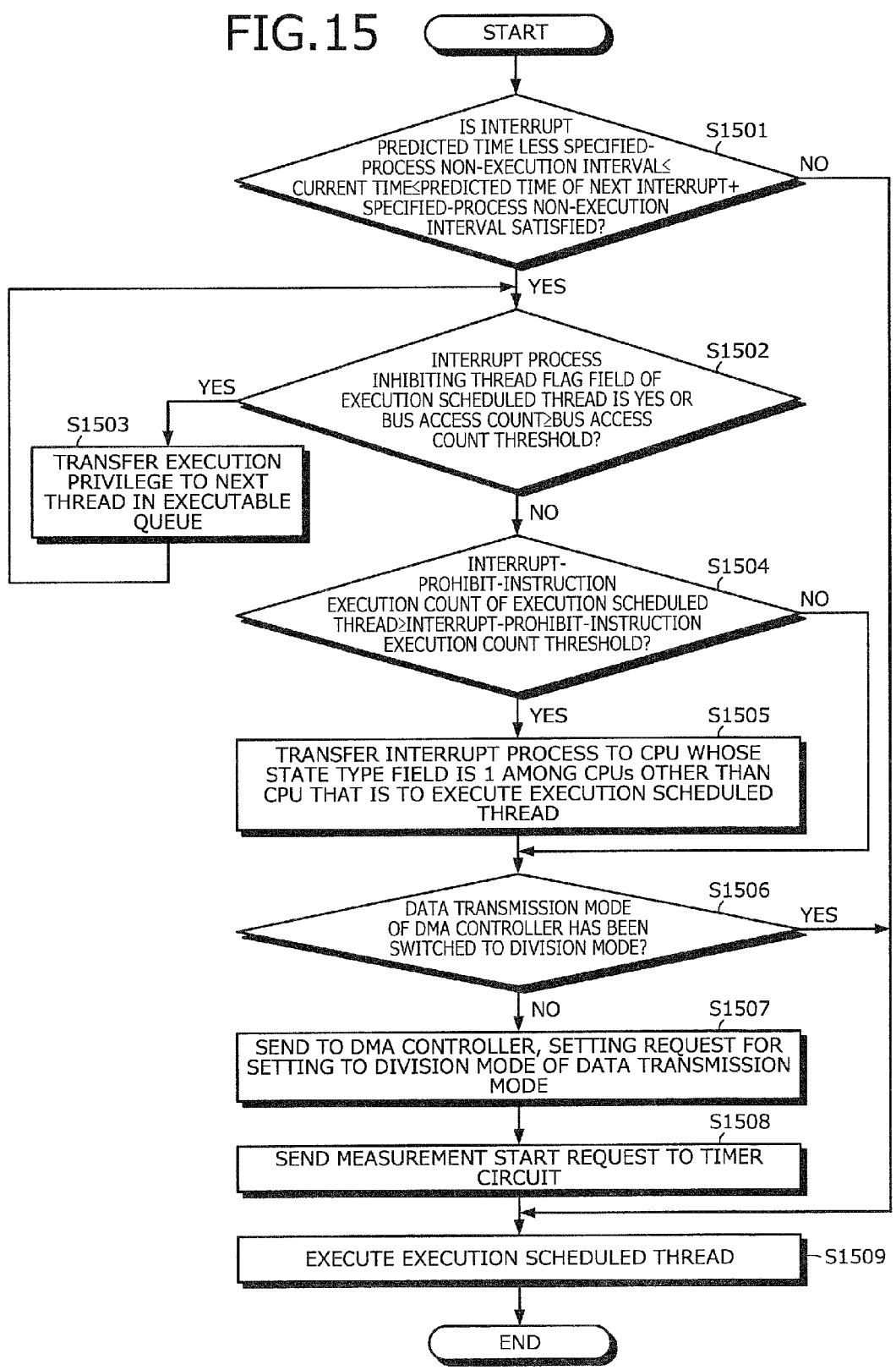
FIG. 15 is a flowchart that depicts one example of a procedure of a process at thread switching.

FIG. 15 is a flowchart that depicts one example of a procedure of the process at thread switching. The process at thread switching is a process performed when a thread switching event occurs and is executed by being called in the exclusion process for the interrupt inhibiting cause. A thread executed by thread switching is called an execution scheduled thread.

The CPU#0 judges whether the predicted time of the next interrupt less the specified-process non-execution interval≤the current time≤next interrupt predicted time+the specified-process non-execution interval is satisfied (step S1501). If the condition is satisfied (step S1501: YES), the CPU#0 judges whether the interrupt process inhibiting thread flag field of the execution scheduled thread is YES or if the bus access count is greater than or equal to the bus access count threshold (step S1502).

If the interrupt process inhibiting thread flag field is YES, or if the bus access count is greater than or equal to the bus access count threshold (step S1502: YES), the CPU#0 transfers the execution privilege to the next thread in the executable queue (step S1503), and transitions to the operation at step S1502. Consequent to the execution of the operation at step S1503, the execution scheduled thread becomes the next thread in the executable queue.

If the interrupt process inhibiting thread flag field is NO and the bus access count is less than the bus access count threshold (step S1502: NO), the CPU#0 judges if the interrupt-prohibit-instruction execution count of the execution scheduled thread is greater than or equal to the interrupt-prohibit-instruction execution count threshold (step S1504). If the interrupt-prohibit-instruction execution count is greater than or equal to the interrupt-prohibit-instruction execution count threshold (step S1504: YES), the CPU#0 transfers the interrupt process to a CPU whose state type field is 1 among the CPUs other than the CPU that is to execute the execution scheduled thread (step S1505).

After the completion of step S1505, or if the interrupt-prohibit-instruction execution count is less than the interrupt-prohibit-instruction execution count threshold (step S1504: NO), the CPU#0 judges whether the data transmission mode of the DMA controller 208 has been switched to the division mode (step S1506). If not (step S1506: NO), the CPU#0 sends to the DMA controller 208, a setting request for setting to the division mode of the data transmission mode (step S1507). Subsequently, the CPU#0 sends a measurement start request to the timer circuit 401 (step S1508).

Upon completion of the operation at step S1508 or if the condition at step S1501 is not satisfied (step S1501: NO), or if switching to the division mode has been completed (step S1506: YES), the CPU#0 executes the execution scheduled thread (step S1509), and ends the process at thread switching. Thus, execution of the process at thread switching depicted in FIG. 15 enables the data processing apparatus 100 to exclude inhibiting causes and to expedite execution of an interrupt process corresponding to an interrupt request for an inhibiting thread.

Figure 16:
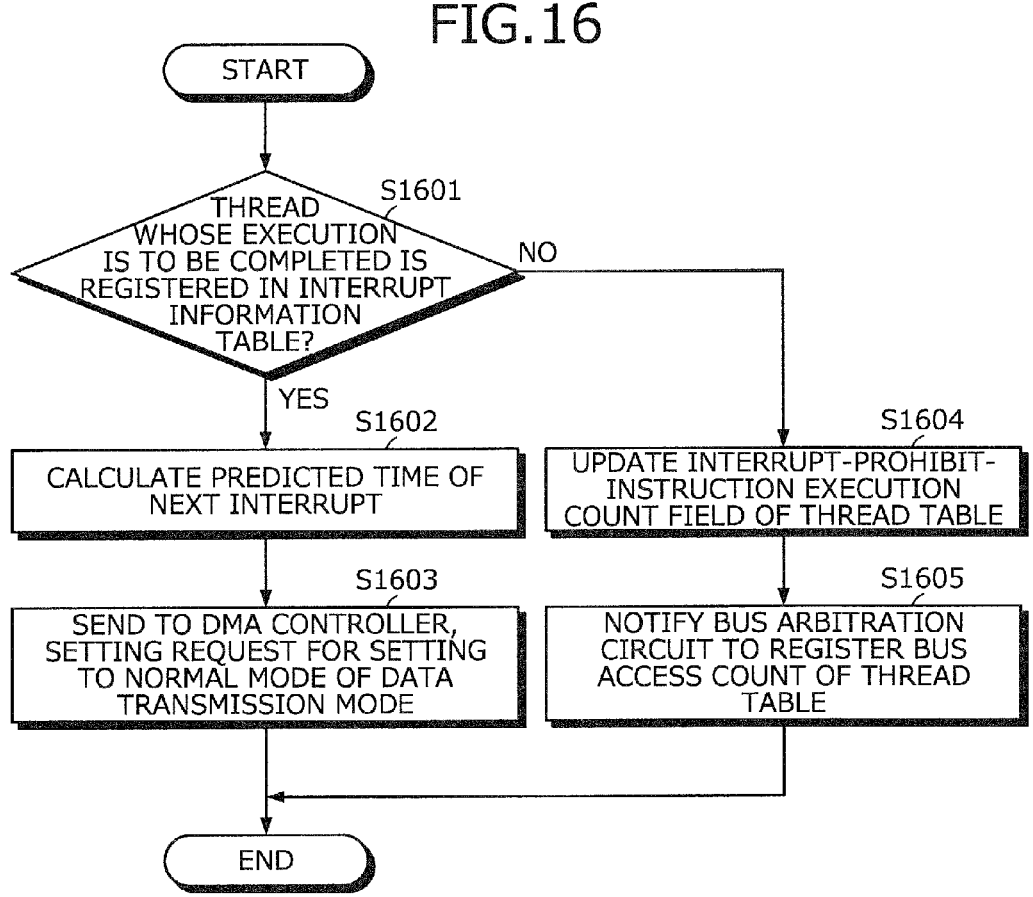
FIG. 16 is a flowchart that depicts one example of a procedure of a process at thread execution completion.

FIG. 16 is a flowchart that depicts one example of a procedure of a process at thread execution completion. The process is executed when the execution of a thread has been completed. Further, the process at thread execution completion is executed by being called in the exclusion process for the interrupt inhibiting cause.

The CPU#0 judges whether a thread whose execution is to be completed is a thread that is registered in the interrupt information table 313 (step S1601). If so (step S1601: YES), the CPU#0 calculates the predicted time of the next interrupt (step S1602). More specifically, the CPU#0 calculates Equations (1) and (2) as the operation at step S1602. The CPU#0 sends to the DMA controller 208, a setting request for setting to the normal mode of the data transmission mode (step S1603), and ends the process at thread execution completion.

If the thread is not a thread that is registered in the interrupt information table 313 (step S1601: NO), the CPU#0 updates the interrupt-prohibit-instruction execution count field of the thread table 312 (step S1604). The CPU#0 notifies the bus arbitration circuit 212 to register the bus access count of the thread table 312 (step S1605), and ends the process at thread execution completion. The bus arbitration circuit 212 having received the notification, updates the bus access count of the thread table 312.

Thus, execution of the process at thread execution completion depicted in FIG. 16 enables the data processing apparatus 100 to update the predicted time of the next interrupt, the interrupt prohibit instruction count, and the bus access count with respect to a thread whose execution has been completed.

Figure 17:
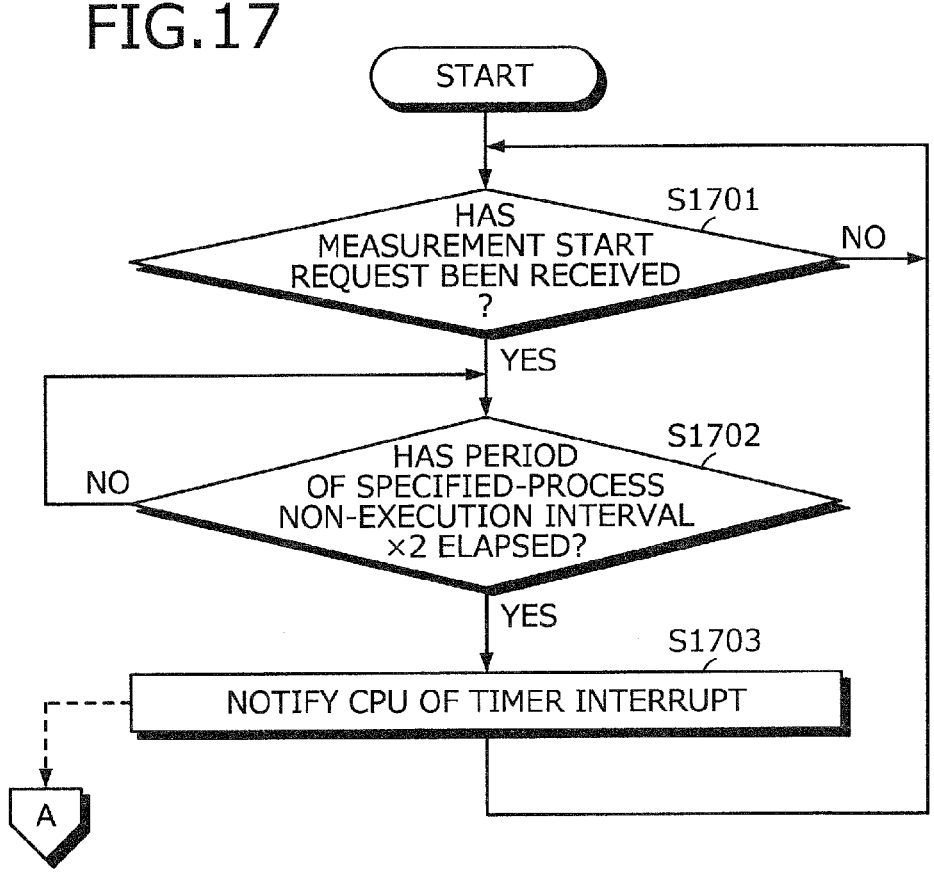
FIG. 17 is a flowchart that depicts one example of a procedure of a process of a timer circuit.

FIG. 17 is a flowchart that depicts one example of a procedure of a process of the timer circuit. FIG. 17 describes an operation of the timer circuit 401. The timer circuit 401 judges whether a measurement start request has been received from the CPU#0 (step S1701). If not (step S1701: NO), the timer circuit 401 again executes the operation at step S1701 after a given period has elapsed (step S1701: YES). The timer circuit 401 judges whether a period of the specified-process non-execution interval×2 has elapsed (step S1702). If not (step S1702: NO), the timer circuit 401 again executes the operation at step S1702 after a given period has elapsed.

If the period has elapsed (step S1702: YES), the timer circuit 401 notifies the CPU#0 of a timer interrupt (step S1703), and transitions to the operation at step S1701. By the operation at step S1703, the CPU#0 executes step S1401: timer interrupt. Thus, the process of the timer circuit 401 depicted in FIG. 17 enables the data processing apparatus 100 to detects the time of the interrupt predicted time+the specified-process non-execution interval.

Figure 18:
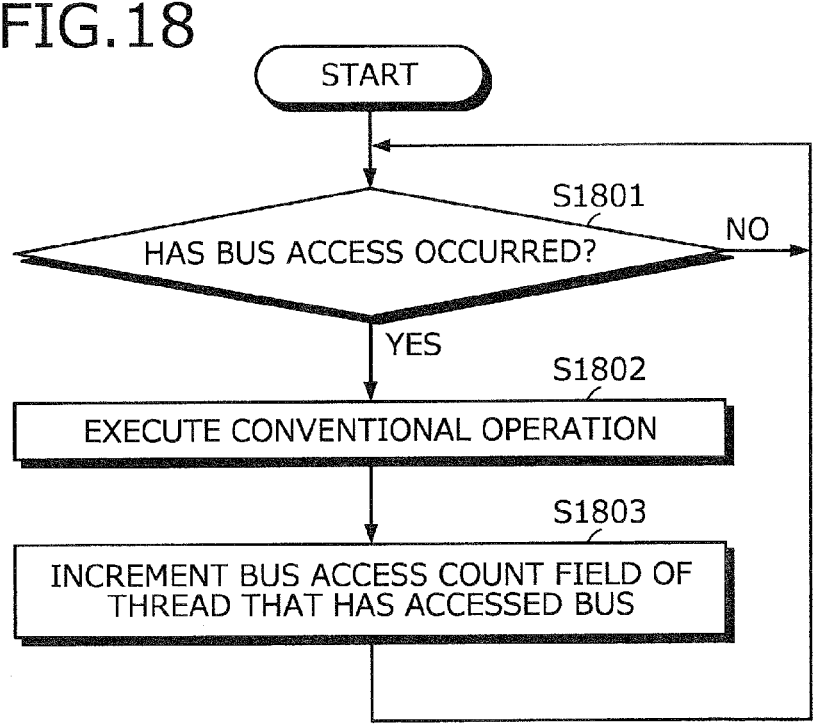
FIG. 18 is a flowchart that depicts one example of a procedure of a process of a bus arbitration circuit.

FIG. 18 is a flowchart that depicts one example of a procedure of a process of the bus arbitration circuit. FIG. 18 describes the operation of the bus arbitration circuit 212. The bus arbitration circuit 212 judges whether a bus access has occurred (step S1801). If not (step S1801: NO), the bus arbitration circuit 212 again executes the operation at step S1801. If a bus access has occurred (step S1801: YES), the bus arbitration circuit 212 executes a conventional operation (step S1802). Here, the conventional operation is an arbitration process for bus access.

The bus arbitration circuit 212 increments the bus access count field of the thread that has accessed the bus (step S1803), and transitions to the operation at step S1801. Thus, the process of the bus arbitration circuit 212 depicted in FIG. 18 enables the data processing apparatus 100 to obtain a bus access count for each thread.

FIG. 19 is a flowchart that depicts one example of a procedure of a process of the DMA controller. FIG. 19 describes operation of the DMA controller 208. The DMA controller 208 sets the divisor to 1 (step S1901). The DMA controller 208 sets the divisor state to 0 subsequent to the operation at step S1901. Next, the DMA controller 208 judges whether a setting request for setting to the division mode of the data transmission mode has been received (step S1902). If not (step S1902: NO), the DMA controller 208 again executes the operation at step S1902 after a given period has elapsed. If a setting request for setting to the division mode has been received (step S1902: YES), the DMA controller 208 sets the switching unit time to the specified-process non-execution interval/(the maximum divisor−1) (step S1903).

The DMA controller 208 increments the divisor (step S1904), and judges whether the switching unit time has elapsed (step S1905). If not (step S1905: NO), the DMA controller 208 again executes the operation at step S1905 after a given period has elapsed.

If the switching unit time has elapsed (step S1905: YES), the DMA controller 208 increments the divisor (step S1906), and judges whether the divisor is less than the maximum divisor (step S1907). If so (step S1907: YES), the DMA controller 208 transitions to the operation at step S1905. By the operations at steps S1904 to S1907, operations for the period from time t0 to t2 depicted in FIG. 13 are executed.

If the divisor is greater than or equal to the maximum divisor (step S1907: NO), the DMA controller 208 judges whether the switching unit time has elapsed (step S1908). Further, the DMA controller 208 sets the divisor state to 1 subsequent to the operation at step S1907: NO. If the switching unit time has not elapsed (step S1908: NO), the DMA controller 208 again executes the operation at step S1908 after a given period has elapsed. Consequent to the operation at step S1908, execution of the operations for the period from time t2 until the predicted time depicted in FIG. 13 is performed.

If the switching unit time has elapsed (step S1908: YES), the DMA controller 208 judges whether the switching unit time has elapsed (step S1909). If not (step S1909: NO), the DMA controller 208 again executes the operation at step S1909 after a given period has elapsed. If the switching unit time has elapsed (step S1909: YES), the DMA controller 208 increments the divisor (step S1910).

The DMA controller 208 judges whether the divisor is greater than 1 (step S1911). If the divisor is greater than 1 (step S1911: YES), the DMA controller 208 transitions to the operation at step S1909. If the divisor is less than or equal to 1 (step S1911: NO), the DMA controller 208 transitions to the operation at step S1902. Further, the DMA controller 208 sets the divisor state to 0 subsequent to the operation at S1911: NO. Consequent to the operations at steps S1909 to S1911, execution of the operations for the period from the predicted time until time t5 depicted in FIG. 13 is performed.

Although not depicted in FIG. 19, if a setting request for setting to the normal mode is received by the CPU#0, the DMA controller 208 sets the divisor to 1, the divisor state to 0, and transitions to the operation at step S1902. Thus, the process of the DMA controller 208 depicted in FIG. 19 enables the data processing apparatus 100 to maximize the divisor near the predicted time.

FIG. 20 is a diagram depicting an application example of a system employing the computer according to the present embodiment. In FIG. 20, a network NW is a network that enables communication between servers 2001 and 2002 and clients 2031 to 2034, and for example, includes a LAN, a WAN, the Internet, a mobile telephone network, etc.

The servers 2002 are management servers of a server group (servers 2021 to 2025) of a cloud 2020. The client 2031 is a notebook personal computer (PC). The client 2032 is a desktop PC. The client 2033 is a mobile telephone. As a mobile telephone, the client 2033 may be smartphone, a personal handyphone system (PHS) terminal, etc. The client 2034 is a tablet terminal.

The server 2001, the servers 2002, the servers 2021 to 2025, and the clients 2031 to 2034 depicted in FIG. 20, for example, as the data processing apparatus described in the embodiment, executes the data processing apparatus according to the embodiment. For example, at the server 2021, if a thread that executes an interrupt prohibit instruction is executed, an execution of the interrupt process at the server 2022 enables the response performance to be improved.

As described, according to the data processing apparatus, the scheduling method, and the computer product, a predicted time when an interrupt request will next occur is obtained and when a thread is to be executed, if the current time is near the predicted time, the thread is not executed. As a result, the data processing apparatus is able to improve response performance since the interrupt process is not inhibited.

Further, when a thread is to be executed, the data processing apparatus may refer to information that indicates whether execution of the interrupt process will be inhibited to determine whether to execute a thread. As a result, if the thread does not inhibit execution of the interrupt process, the data processing apparatus can continue to execute the thread even if there is a possibility of the interrupt process occurring.

When there is a possibility of the interrupt process being executed while the detected thread is under execution and the detected thread is judged to inhibit execution of the interrupt process, configuration may be such that the data processing apparatus does not execute the detected thread on a CPU. As a result, the data processing apparatus can improve the accuracy of judging to not execute a thread because the interrupt process will be inhibited.

The data processing apparatus may judge whether a thread will inhibit execution of the interrupt process, based on the access count by the thread to the bus. As a result, concerning a thread whose access count to the bus suddenly increases during execution, the data processing apparatus can judge that execution of the interrupt process will be inhibited and therefore, can limit the timing when the thread is not executed to when the possibility of the interrupt process being inhibited is high.

The data processing apparatus may judge whether a thread will inhibit execution of the interrupt process, based on the interrupt-prohibit-instruction execution count of the thread. As a result, concerning a thread whose interrupt prohibit instruction count suddenly increases during execution, the data processing apparatus judges that execution of the interrupt process will be inhibited and therefore, can limit the timing when the thread is not executed to when the possibility of the interrupt process being inhibited is high.

When execution of the interrupt process is judged to be inhibited based on the interrupt-prohibit-instruction execution count, the data processing apparatus may use separate CPUS to execute the thread and to execute the interrupt process. As a result, compared to a method of not executing the tread as a method of preventing inhibition of the interrupt process, execution of the thread is possible and therefore, operation according to the actual scheduling can be performed.

According to the data processing apparatus, the transmitting apparatus, the transmission control method, and the computer product, a time frame when an interrupt request will next occur is determined, and during the time frame, transmission data units of the DMA controller are made small. As a result, during the time frame, the release count of the bus increases, thereby causing the execution timing of the interrupt process to be expedited and enabling the data processing apparatus to improve response performance.

The transmitting apparatus obtains the time frame when an interrupt request will next occur and the predicted time, and may minimize the size of the data unit for transmission at the predicted time. As a result, the release count of the bus increases near the predicted time, thereby causing the execution timing of the interrupt process to be expedited and enabling the data processing apparatus to further improve response performance. During a time frame when no interrupt request is expected to be received, the size of the data unit for transmission is increased, whereby transmission speed increases, enabling the data processing apparatus to improve processing performance.

Although a method of increasing the clock frequency of the CPU is another method of improving response performance, this method consumes a lot of power. With the scheduling method and the transmission control method of the present embodiment, power consumption does not become large, enabling response performance to be improved while maintaining the same power consumption.

The scheduling method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

The DMA controller 208 described in the present embodiment can be realized by an application specific integrated circuit (ASIC) such as a standard cell or a structured ASIC, or a programmable logic device (PLD) such as a field-programmable gate array (FPGA). Specifically, for example, functional units (the timer circuit 401 to the transmitting unit 405) of the DMA controller 208 are defined in hardware description language (HDL), which is logically synthesized and applied to the ASIC, the PLD, etc., thereby enabling manufacture of the DMA controller 208.

According to one aspect of the present embodiments, response performance is improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing apparatus comprising
a processor configured to:
  receive an interrupt request that is a trigger for execution of an interrupt process executed by the processor;
  store the received interrupt request to a recording area;
  calculate based on a time when the interrupt request is received and particular time information read from the recording area, a predicted time when a subsequent interrupt request is to be received;
  detect a thread to be executed by the processor, among executable threads of the processor;
  judge based on the calculated predicted time and a current time, whether there is a possibility of the interrupt process being executed while the detected thread is under execution;
  decide based on a judgment result, whether to execute the detected thread on the processor; and
  execute the detected thread on the processor, based on a decision result.

2. The data processing apparatus according to claim 1, further comprising
a memory unit that records in another recording area other than the recording area, first information that indicates whether the executable threads inhibit execution of the interrupt process, wherein
the processor judges refers to the first information and judges whether the detected thread inhibits execution of the interrupt process.

3. The data processing apparatus according to claim 2, wherein
the processor decides to not execute the detected thread on the processor, upon judging that there is the possibility of the interrupt process being executed while the detected thread is under execution and upon judging that the detected thread inhibits execution of the interrupt process, and
the processor executes on the processor, another thread other than the detected thread among the executable threads, upon deciding to not execute the detected thread.

4. The data processing apparatus according to claim 1, wherein
the processor is configured to obtain an access count of a number of times that the processor accesses a bus consequent to execution of an executable thread among the executable threads, and
the processor judges based on the obtained access count, whether the detected thread inhibits execution of the interrupt process.

5. The data processing apparatus according to claim 1, wherein
the processor is configured to obtain an interrupt-prohibit-instruction execution count of the processor consequent to execution of an executable thread among the executable threads, and
the processor judges based on the obtained interrupt-prohibit-instruction execution count, whether the detected thread inhibits execution of the interrupt process.

6. The data processing apparatus according to claim 5, wherein
the processor detects a thread to be executed by a first processor when the processor is provided in plural,
the processor, upon judging that there is the possibility of the interrupt process being executed while the detected thread is under execution and judging that based on the interrupt-prohibit-instruction execution count, the detected thread inhibits execution of the interrupt process, decides to execute any one among the detected thread and the interrupt process on the first processor and to execute the other among the detected thread and the interrupt process on a second processor other than the first processor among the processors, and
the processor executes the any one among the detected thread and the interrupt process on the first processor and executes the other among the detected thread and the interrupt process on the second processor.

7. A data processing apparatus comprising
a processor configured to
receive an interrupt request that is a trigger for execution of an interrupt process executed by the processor;
store the received interrupt request to a recording area;
determine based on a time when the interrupt request is received and particular time information read from the recording area, a time frame when a subsequent interrupt request is to be received; and
control a transmitting apparatus to perform transmission by increasing a value of a divisor of a data unit for transmission during the time frame to be greater than the value of the divisor at times outside the time frame.

8. A transmitting apparatus comprising:
a memory unit that records therein a value of a divisor of a data unit for transmission; and
a processor configured to:
obtain from a receiving apparatus of an interrupt request, a time frame when the interrupt request is to be received at the receiving apparatus, the time frame being determined based on a time when the interrupt request is received and particular time information read from the memory;
change the value of the divisor for the obtained time frame to be greater than the value of the divisor recorded in the memory unit; and
transmit data by dividing the data by the changed value of the divisor.

9. The transmitting apparatus according to claim 8, wherein
the processor obtains a predicted time when the interrupt request is to be received;
the processor, within the time frame from a start time of the time frame until the predicted time, changes the value of the divisor post-change to a value greater than that pre-change, and within the time from the predicted time until an end time of the time frame, changes the value of the divisor post-change to a value less than that pre-change.

10. A scheduling method comprising:
receiving an interrupt request that is a trigger for execution of an interrupt process executed by a processor;
storing the receive interrupt request to a recording area;
calculating based on a time when the interrupt request is received and particular time information read from the recording area, a predicted time when a subsequent interrupt request is to be received;
detecting a thread to be executed by the processor, among executable threads of the processor;
judging based on the calculated predicted time and a current time, whether there is a possibility of the interrupt process being executed while the detected thread is under execution;
deciding based in a judgment result, whether to execute the detected thread on the processor; and
executing the detected thread on the processor, based on a decision result, wherein
the scheduling method is executed by a computer.

11. A transmission control method comprising:
receiving an interrupt request that is a trigger for execution of an interrupt process executed by a processor;
storing the received interrupt request to a recording area;
determining based on a time when the interrupt request is received and particular time information read from the recording area, a time frame when a subsequent interrupt request is to be received; and
controlling a transmitting apparatus to perform transmission by increasing a value of a divisor of a data unit for transmission during the time frame to be greater than the value of the divisor at times outside the time frame, wherein
the transmission control method is executed by a computer.

12. A non-transitory, computer-readable recording medium storing a scheduling program that causes a computer to execute a process comprising:
receiving an interrupt request that is a trigger for execution of an interrupt process executed by a processor;
storing the receive interrupt request to a recording area;
calculating based on a time when the interrupt request is received and particular time information read from the recording area, a predicted time when a subsequent interrupt request is to be received;
detecting a thread to be executed by the processor, among executable threads of the processor;

judging based on the calculated predicted time and a current time, whether there is a possibility of the interrupt process being executed while the detected thread is under execution;

deciding based in a judgment result, whether to execute the detected thread on the processor; and executing the detected thread on the processor, based on a decision result.

13. A non-transitory, computer-readable recording medium storing a transmission control program that causes a computer to execute a process comprising:

receiving an interrupt request that is a trigger for execution of an interrupt process executed by a processor;

storing the received interrupt request to a recording area;

determining based on a time when the interrupt request is received and particular time information read from the recording area, a time frame when a subsequent interrupt request is to be received; and controlling a transmitting apparatus to perform transmission by increasing a value of a divisor of a data unit for transmission during the time frame to be greater than the value of the divisor at times outside the time frame.

* * * * *